United States Patent [19]
Tsuboi et al.

[11] Patent Number: 5,765,128
[45] Date of Patent: Jun. 9, 1998

[54] APPARATUS FOR SYNCHRONIZING A VOICE CODER AND A VOICE DECODER OF A VECTOR-CODING TYPE

[75] Inventors: Mitsuru Tsuboi; Naoji Fujino; Noboru Kobayashi, all of Kawasaki; Toshiaki Nobumoto; Toshiyuki Ohta, both of Fukuoka; Yutaka Moriyama, Kawasaki; Nobuhide Eguchi; Miki Murakawa, both of Fukuoka, all of Japan

[73] Assignee: Fujitsu Limited, Kanagawa, Japan

[21] Appl. No.: 537,454

[22] Filed: Oct. 2, 1995

[30] Foreign Application Priority Data

Dec. 21, 1994 [JP] Japan .................. 6-318348

[51] Int. Cl.[6] ............................ G10L 3/00
[52] U.S. Cl. ................ 704/222; 704/208; 704/214; 704/226; 704/258; 704/264
[58] Field of Search ................ 395/2.1, 2.17, 395/2.23, 2.31, 3.35, 2.67, 2.73

[56] References Cited

U.S. PATENT DOCUMENTS

| | | | |
|---|---|---|---|
| 4,903,301 | 2/1990 | Kondo et al. | 395/2.31 |
| 5,524,170 | 6/1996 | Matsuo et al. | 395/2.31 |
| 5,579,430 | 11/1996 | Grill et al. | 395/2.12 |

FOREIGN PATENT DOCUMENTS 683399   3/1994   Japan .

OTHER PUBLICATIONS

Alvarez–Cuevas et al. "Voice Synchronization in Packet Switching Networks," IEEE Network, Sep. 1993.

*Primary Examiner*—Allen R. MacDonald
*Assistant Examiner*—Alphonso A. Collins
*Attorney, Agent, or Firm*—Helfgott & Karas, P.C.

[57] ABSTRACT

An apparatus synchronizes a voice coder and a voice decoder which are of the vector-coding type in order to prevent a false synchronization even when a signal having the same period as a string of synchronizing bits is inputted. A noise component adding unit adds a noise component to an input voice signal. Therefore, even if the input voice signal has the same period as that of a string of synchronizing bits and is completely periodic, the periodicity of the input voice signal is lost by the added noise component. Based on the input voice signal which is no longer periodic, a vector-coding unit, a quantizing signal vector generating unit, and a code book index transmitting unit generate code book indexes and transmit the generated code book indexes to a voice decoder. Therefore, the voice decoder is prevented from developing a false synchronization.

10 Claims, 29 Drawing Sheets

APPARATUS FOR SYNCHRONIZING A VOICE CODER AND A VOICE DECODER OF A VECTOR-CODING TYPE

BACKGROUND OF THE INVENTION

(1) Field of the Invention

The present invention relates to an apparatus for synchronizing a voice coder and a voice decoder which are of the vector-coding type, and more particularly to an apparatus for synchronizing a voice coder to insert a string of synchronizing bits on the bit-stealing principle and a voice decoder to synchronize a code book index based on the string of synchronizing bits.

(2) Description of the Related Art

In recent years, growing attention has been attracted to a vector-coding system for coding a plurality of voice samples into one vector, as one of high-quality low-bit-rate voice coding systems.

According to a conventional vector-coding system, as shown in FIG. 25 of the accompanying drawings, a voice coder and a voice decoder have respective code books 101, 111 each as a dictionary of code vectors. The voice coder has a vector generator 102 which samples an input voice signal, generates a vector of every set of several samples, and outputs the generated vector as a target vector to an error detector 103. The voice coder also has a synthesizing filter 104 which generates a quantizing signal vector based on the code vectors in the code book 101, and outputs the generated quantizing signal vector to the error detector 103. The error detector 103 calculates the difference between the target vector and the quantizing signal vector, and sends the calculated difference to an error estimator 105. The error estimator 105 selects a code vector from the code book 101 to minimize the difference under feedback control. A code book index corresponding to the selected code vector is transmitted from the voice coder to the voice decoder.

The code book 111 outputs a code vector selected based on the transmitted code book index to a synthesizing filter 112, which outputs a reproduced signal that corresponds to the input voice signal supplied to the voice coder.

Since code book indexes are successively transmitted from the voice coder to the voice decoder, the voice decoder is required to identify the boundaries between the code book indexes in order to recognize the transmitted code book indexes. To meet such a requirement, the voice decoder is synchronized with the voice coder.

One process of synchronizing the voice decoder with the voice coder is a bit-stealing process which embeds a string of synchronizing bits in a portion of a code. This process is effective particularly for transmitting bits at a low rate because the portion of the code which doubles as synchronizing bits does not occupy a special band for the transmission of synchronizing information. Specifically, process employs a code book as shown in FIG. 26 of the accompanying drawings, the code book contains code vectors corresponding to respective 4-bit code book indexes (hereinafter referred to as "indexes") "0000"~"1111". When the code book is searched, an index is selected from a range 121 at a time to embed a synchronizing bit "0", and an index is selected from a range 122 at a time to embed a synchronizing bit "1". The synchronizing bit is embedded in the MSB (Most Significant Bit) of the selected index.

A detailed procedure for searching the code book will be described below according to its successive steps with reference to FIG. 27 of the accompanying drawings.

[S101] It is determined whether the present time is a time to embed a synchronizing bit or not. If it is, then the processing goes to a step S103, and if it is not, then the processing goes to a step S102. Synchronizing bits are not embedded in all indexes, but embedded in every several indexes.

[S102] An index is selected freely, but not selectively, from both the ranges 121, 122.

[S103] It is determined whether a synchronizing bit to be embedded is "1" or not. If "1", then the processing goes to a step S105, and if "0", then the processing goes to a step S104. A string of synchronizing bits has a bit pattern "1000", for example.

[S104] An index is selected from the range 121 that is composed of indexes "0000"~"0111".

[S105] An index is selected from the range 122 that is composed of indexes "1000"~"1111".

By thus limiting the range from which to select an index when the code book is searched, it is made possible to embed synchronizing bits in a code.

According to the above bit-stealing process, however, when a completely periodic input signal with repeated identical patterns, e.g., a digital sine-wave signal, is vector-coded, selected indexes are also periodic. If the period of indexes is the same as the period of a string of synchronizing bits, then the same pattern as the synchronizing pattern of the string of synchronizing bits may possibly exist in bit positions of the indexes other than the synchronizing bits embedded therein. If the same pattern as the synchronizing pattern exists in those bit positions of the indexes, then it is likely for the indexes to be synchronized, i.e., for the boundaries between the indexes to be identified, based on a string of bits which is not a true string of synchronizing bits.

Such a problem will be described in detail below with reference to FIGS. 28 and 29 of the accompanying drawings.

FIG. 28 shows an input voice signal and indexes searched for according to the vector-coding of the input voice signal. It is assumed that the input voice signal is completely periodic and composed of repeated identical patterns. If an initial region, for example, of a repetitive period 123 corresponds to a time to embed a synchronizing bit, then an index "1001" is selected at the time, an index "0010" is selected at a next time to embed a synchronizing bit, an index "0100" is selected at a next time to embed a synchronizing bit, and an index "0110" is selected at a next time to embed a synchronizing bit. If the period of the input voice signal is the same as the period of a string of synchronizing bits, then the same indexes as those selected in the repetitive period 123 are selected in a next repetitive period 124.

FIG. 29 illustrates the selected indexes in a vertical array with corresponding bits in vertical alignment. As can be seen from FIG. 29, the MSBs of the indexes where synchronizing bits are embedded in each of the repetitive periods 123, 124 represent a synchronizing pattern "1000". However, the LSBs (Least Significant Bit) of the indexes in each of the repetitive periods 123, 124 also represent a false pattern "1000". A false pattern may exist in other bit positions.

When such a false pattern "1000" is present, the indexes may possibly be synchronized on the basis of the LSBs of the indexes which represent the false pattern "1000", rather than the true string of synchronizing bits. When the indexes are synchronized according to the false pattern, resulting in a false synchronization, the input voice signal cannot be reproduced.

The false synchronization continues insofar as the input voice signal having the same period as the string of synchronizing bits is continuously introduced.

SUMMARY OF THE INVENTION

It is therefore an object of the present invention to provide an apparatus for synchronizing a voice coder and a voice decoder while preventing a false synchronization even when a signal having the same period as a string of synchronizing bits is introduced.

To achieve the above object, there is provided an apparatus for synchronizing a voice coder of the vector-coding type, comprising vector-coding means for vector-coding an input voice signal and outputting a target vector, quantizing signal vector generating means for generating a quantizing signal vector based on a code vector from a code book, code book index transmitting means for determining an error between the target vector outputted from the vector-coding means and the quantizing signal vector generated by the quantizing signal vector generating means, and selecting a code book index corresponding to a code vector to minimize the error from the code book based on the bit-stealing principle and sending the selected index to a voice decoder, and noise component adding means, preceding the vector-coding means, for adding a noise component to the input voice signal which is to be supplied to the vector-coding means.

According to the present invention, an apparatus for synchronizing a voice coder of the vector-coding type comprises vector-coding means for vector-coding an input voice signal and outputting a target vector, quantizing signal vector generating means for generating a quantizing signal vector based on a code vector from a code book, code book index selecting means for determining an error between the target vector outputted from the vector-coding means and the quantizing signal vector generated by the quantizing signal vector generating means, and selecting a code book index corresponding to a code vector to minimize the error from the code book based on the bit-stealing principle, and code book index transmitting means for monitoring the code book index selected by the code book index selecting means, and, if there is a string of bits having the same pattern as a synchronizing pattern, inverting a bit of the string of bits, and transmitting the string of bits with the inverted bit to a voice decoder.

To achieve the above object, there is also provided an apparatus for synchronizing a voice decoder for receiving a code book index from a voice coder of the vector-coding type, comprising synchronizing bit string detecting means for detecting a string of synchronizing bits having a predetermined pattern, contained in a received code book index, over a predetermined number of rear protective stages, confirming means for confirming whether the string of synchronizing bits detected by the synchronizing bit string detecting means is a true string of synchronizing bits or not, synchronizing means for synchronizing the received code book index based on the string of synchronizing bits which has been confirmed as a true string of synchronizing bits by the confirming means, and reproduced signal outputting means for reading a code vector from a code book based on the synchronized code book index, and generating and outputting a reproduced signal.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will first be described below.

Figure 1:
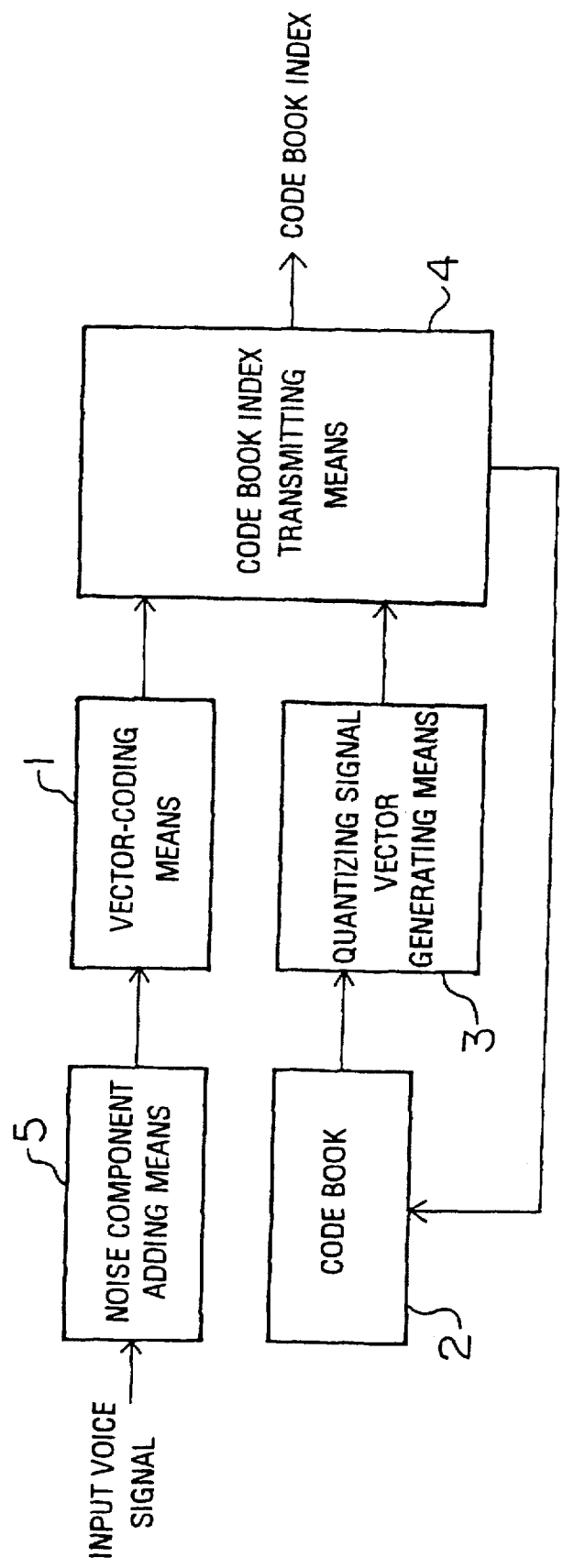
FIG. 1 is a block diagram illustrative of a first system based on the principles of the present invention.

FIG. 1 shows an apparatus for synchronizing a voice coder, which is a first system based on the principles of the present invention. As shown in FIG. 1, the synchronizing apparatus comprises a vector-coding means 1 for vector-coding an input voice signal and outputting a target vector, a quantizing signal vector generating means 3 for generating a quantizing signal vector based on a code vector from a code book 2, a code book index transmitting means 4 for determining the error or difference between the target vector outputted from the vector-coding means 1 and the quantizing signal vector generated by the quantizing signal vector generating means 3, and selecting an index corresponding to a code vector to minimize the error from the code book 2 based on the bit-stealing principle and sending the selected index to a voice decoder, and a noise component adding means 5, which precedes the vector-coding means 1, for adding a noise component to the input voice signal which is to be supplied to the vector-coding means 1.

The synchronizing apparatus shown in FIG. 1 operates as follows: The noise component adding means 5 adds a noise component to an input voice signal which is to be supplied to the vector-coding means 1. Since a noise component has been added to an input voice signal, even if the original input voice signal is completely periodic and has the same period as a string of synchronizing bits, the input voice signal outputted from the noise component adding means 5 is no longer periodic. Therefore, when code book indexes are generated based on this non-periodic voice signal by the vector-coding means 1, the quantizing signal vector generating means 3, and the code book index transmitting means 4 and transmitted to the voice decoder, the voice decoder does not develop any false synchronization.

Figure 2:
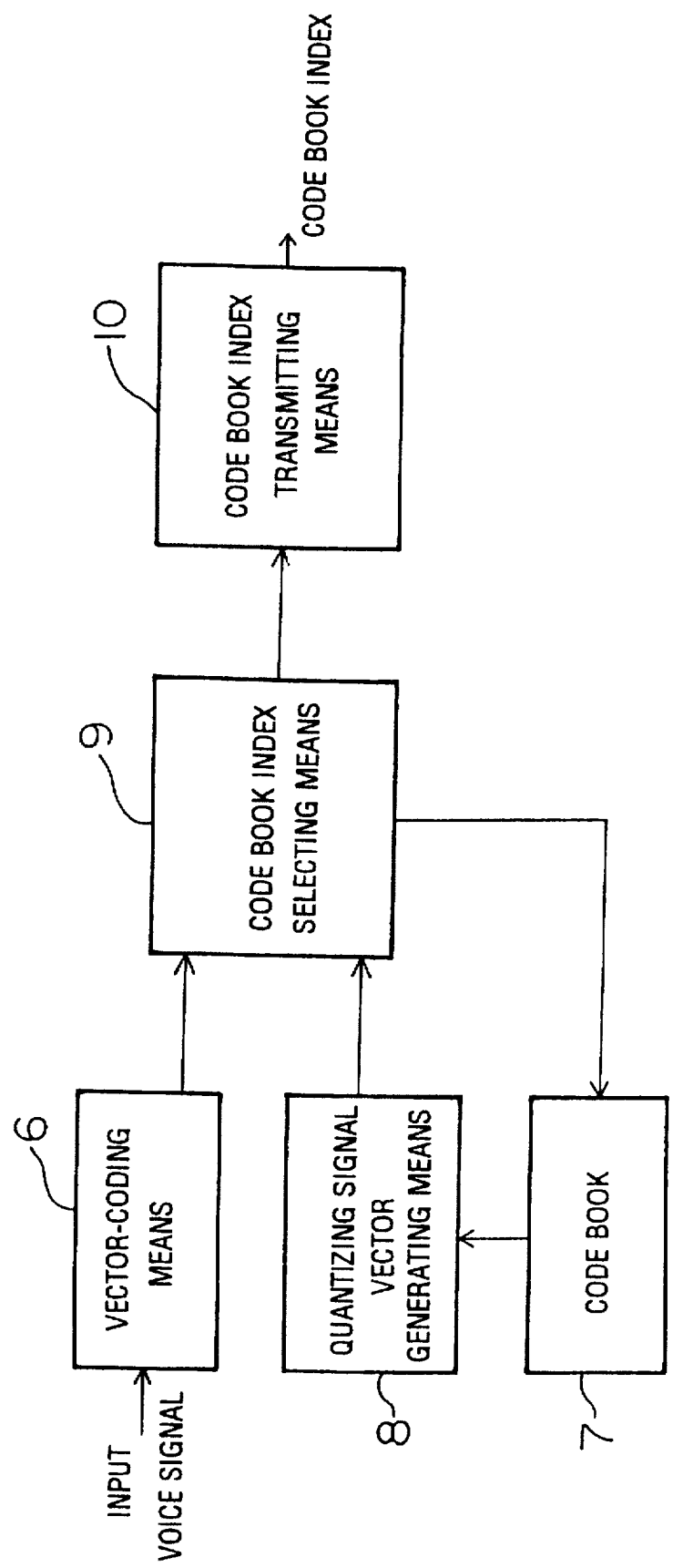
FIG. 2 is a block diagram illustrative of a second system based on the principles of the present invention.

FIG. 2 shows another apparatus for synchronizing a voice coder, which is a second system based on the principles of the present invention. As shown in FIG. 2, the synchronizing apparatus comprises a vector-coding means 6 for vector-coding an input voice signal and outputting a target vector, a quantizing signal vector generating means 8 for generating a quantizing signal vector based on a code vector from a code book 7, a code book index selecting means 9 for determining the error or difference between the target vector outputted from the vector-coding means 6 and the quantizing signal vector generated by the quantizing signal vector generating means 8, and selecting an index corresponding to a code vector to minimize the error from the code book 7 based on the bit-stealing principle, and a code book index transmitting means 10 for monitoring the index selected by the code book index selecting means 9 and, if the index contains a string of bits having the same pattern as a synchronizing pattern, inverting some bits of the string of bits and sending the string of bits including the inverted bits to a voice decoder.

The synchronizing apparatus shown in FIG. 2 operates as follows: The code book index transmitting means 10 monitors the index selected by the code book index selecting means 9 and, if the index contains a string of bits having the same pattern as a synchronizing pattern, inverts some bits of the string of bits and sends the string of bits including the inverted bits to the voice decoder. Specifically, when some bits of the string of bits having the same pattern as the synchronizing pattern are inverted, there is no longer a string of bits having the same pattern as the synchronizing pattern, and hence the voice decoder which has received the index thus processed does not develop any false synchronization.

Figure 3:
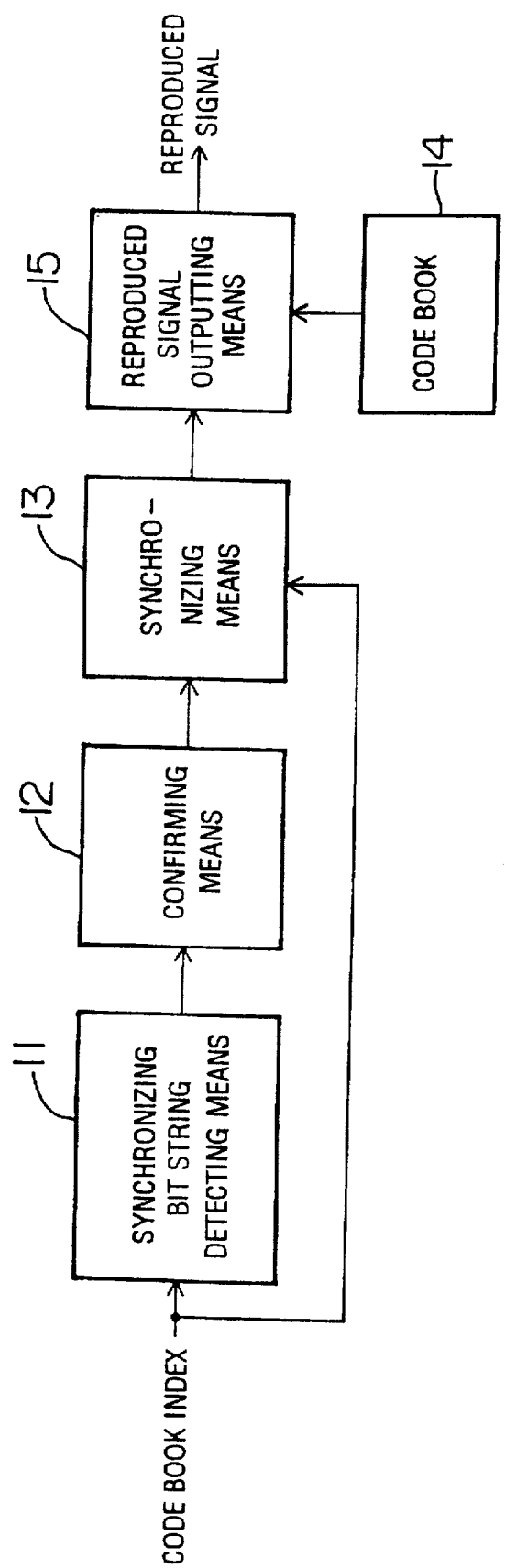
FIG. 3 is a block diagram illustrative of a third system based on the principles of the present invention.

FIG. 3 shows an apparatus for synchronizing a voice decoder, which is a third system based on the principles of the present invention. As shown in FIG. 3, the synchronizing apparatus comprises a synchronizing bit string detecting means 11 for detecting a string of synchronizing bits having a predetermined pattern, contained in a received index, over a predetermined number of rear protective stages, a confirming means 12 for confirming whether the string of synchronizing bits detected by the synchronizing bit string detecting means 11 is a true string of synchronizing bits or not, a synchronizing means 13 for synchronizing the received index based on the string of synchronizing bits which has been confirmed as a true string of synchronizing bits by the confirming means 12, and a reproduced signal outputting means 15 for reading a code vector from a code book 14 based on the synchronized index, and generating and outputting a reproduced signal.

The synchronizing apparatus shown in FIG. 3 operates as follows: The synchronizing bit string detecting means 11 detects a string of synchronizing bits having a predetermined pattern, contained in a received index, over a predetermined number of rear protective stages. Then, the confirming means 12 confirms whether the string of synchronizing bits detected by the synchronizing bit string detecting means 11 is a true string of synchronizing bits or not. The synchronizing means 13 synchronizes the received index based on the string of synchronizing bits which has been confirmed as a true string of synchronizing bits by the confirming means 12. Therefore, the boundaries between indexes are properly identified, and the indexes are clearly recognized. The reproduced signal outputting means 15 reads a code vector from the code book 14 based on the synchronized index, and generates and outputs a reproduced signal. Since the received index is synchronized based on the string of synchronizing bits which has been confirmed as a true string of synchronizing bits by the confirming means 12, the voice decoder does not develop any false synchronization.

Specific embodiments of the present invention will be described below with reference to the drawings.

Figure 4:
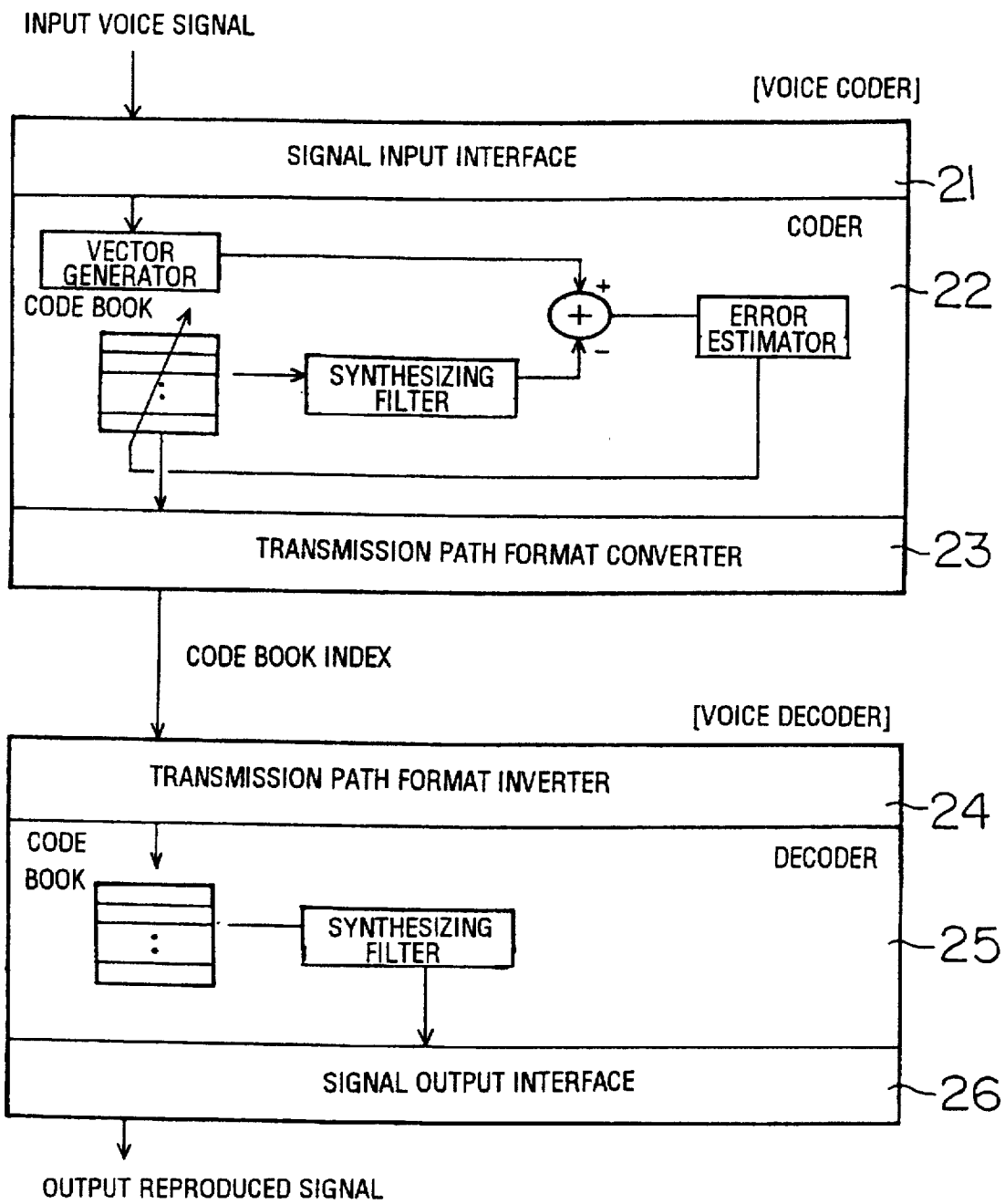
FIG. 4 is a block diagram of an overall arrangement of a voice coder and a voice decoder.
Figure 25:
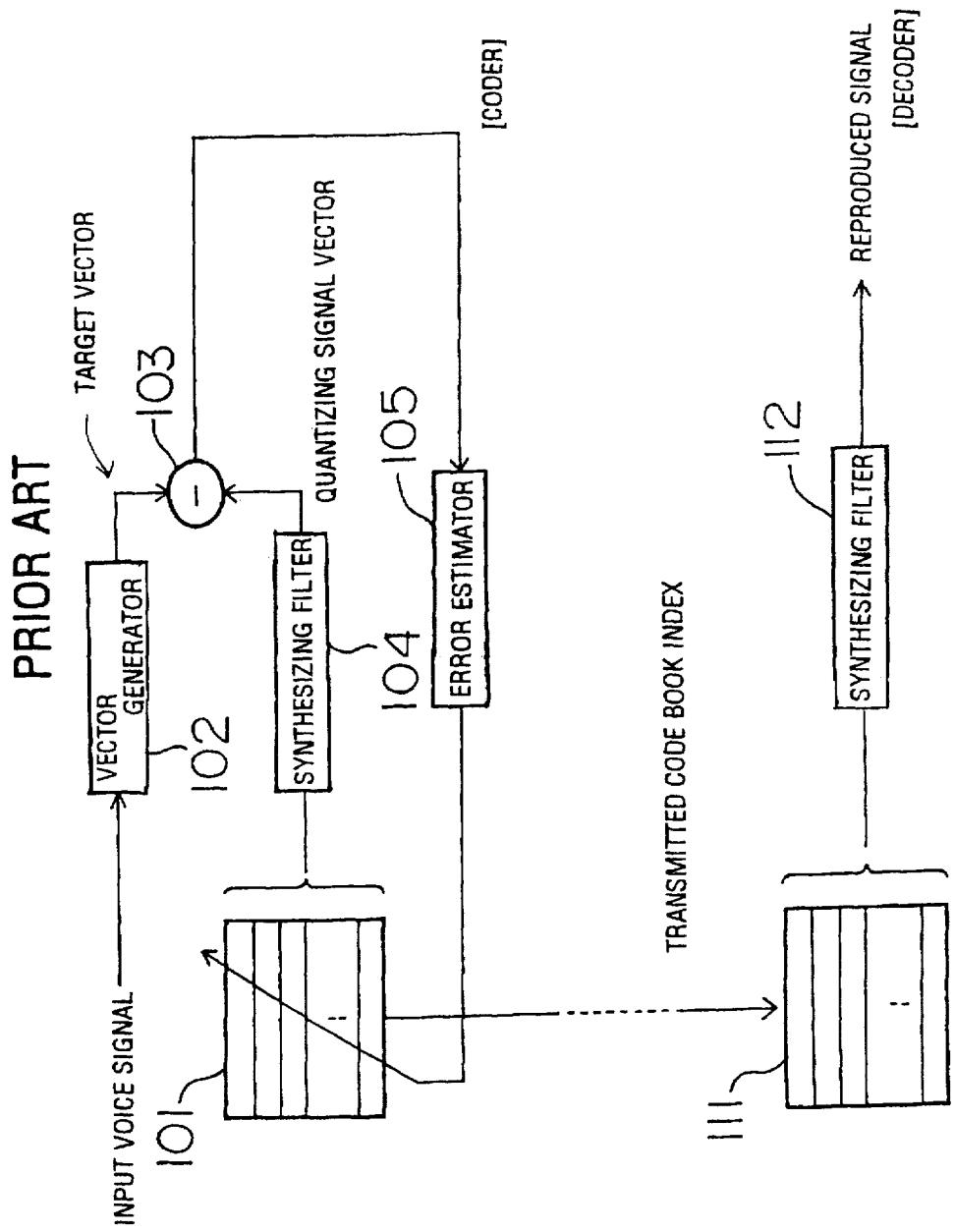
FIG. 25 is a block diagram of a conventional vector-coding system.
Figure 26:
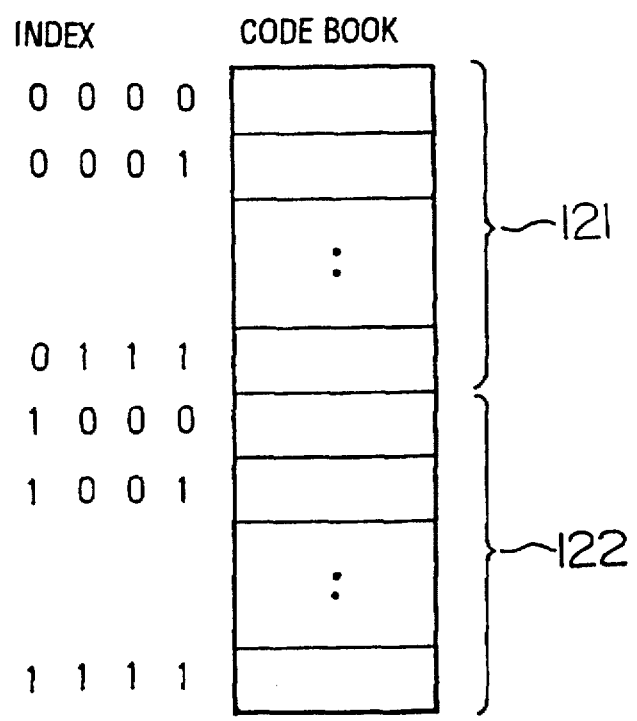
FIG. 26 is a diagram showing a code book.

FIG. 4 shows in block form an overall arrangement of a voice coder and a voice decoder. The voice coder comprises a signal input interface 21, a coder 22, and a transmission path format converter 23. The voice decoder comprises a transmission path format inverter 24, a decoder 25, and a signal output interface 26. The coder 22 corresponds to the coder shown in FIG. 25, and the decoder 25 corresponds to the decoder shown in FIG. 25. The voice coder and the voice decoder are implemented by the firmware of a digital signal processor (DSP).

First and second embodiments of the present invention, described below, are incorporated in the signal input interface 21. A third embodiment of the present invention, described below, is incorporated in the transmission path format converter 23. Fourth, fifth, and sixth embodiments of the present invention, described below, are incorporated in the transmission path format inverter 24. The object of the present invention can be achieved and the conventional problems are solved when either one of the first through sixth embodiments of the present invention is applied to the voice coder or the voice decoder.

Figure 5:
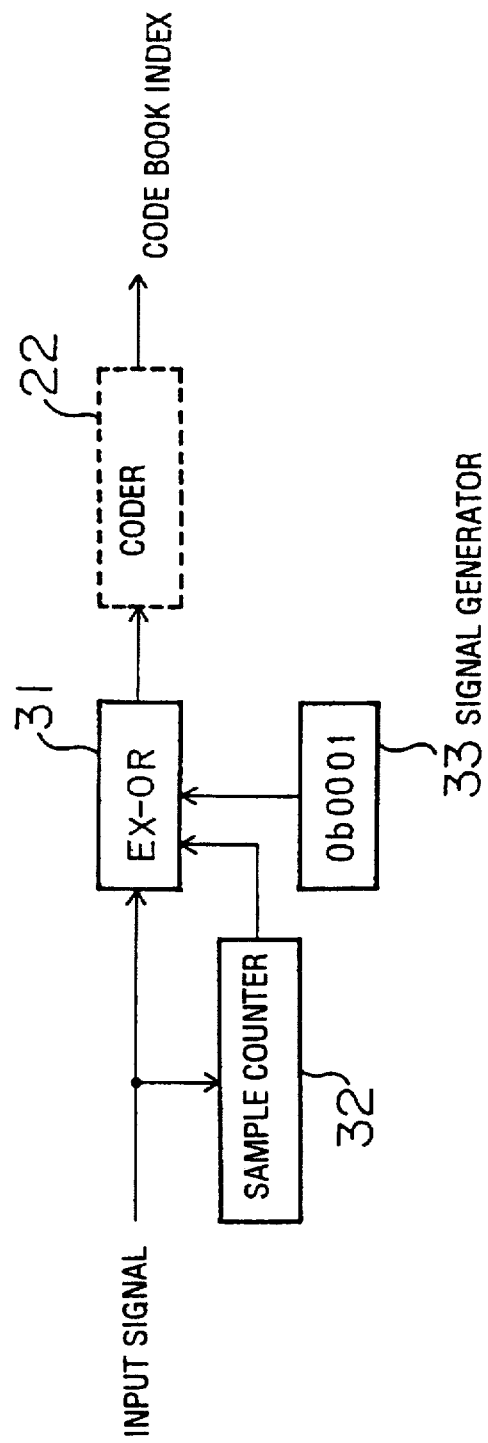
FIG. 5 is a block diagram of a synchronizing apparatus according to a first embodiment of the present invention.

FIG. 5 shows in block form a synchronizing apparatus according to a first embodiment of the present invention. The synchronizing apparatus according to the first embodiment is incorporated in the signal input interface 21 shown in FIG. 4. As shown in FIG. 5, an input signal that represents sampled and quantized data, which may comprise four bits, for example, and is referred to as a "sample", is supplied to an exclusive-OR gate (EX-OR) 31 and a sample counter 32. The sample counter 32 counts up each time a sample is supplied thereto. When the count of the sample counter 32 reaches "19", the sample counter 32 sends an operation command signal to the exclusive-OR gate 31 and resets the count to "0". The exclusive-OR gate 31 is also supplied with a binary code signal "0001" from a signal generator 33. In the absence of an operation command signal from the sample counter 32, the exclusive-OR gate 31 sends the input signal directly to the coder 22. When an operation command signal is received from the sample counter 32, the exclusive-OR gate 31 exclusive-ORs the input signal (sample) and the binary code signal "0001", and sends data indicating the result of the exclusive-ORing process to the coder 22. The data indicating the result of the exclusive-ORing process represents a signal similar to the input signal except that the LSB thereof is inverted.

Figure 6:
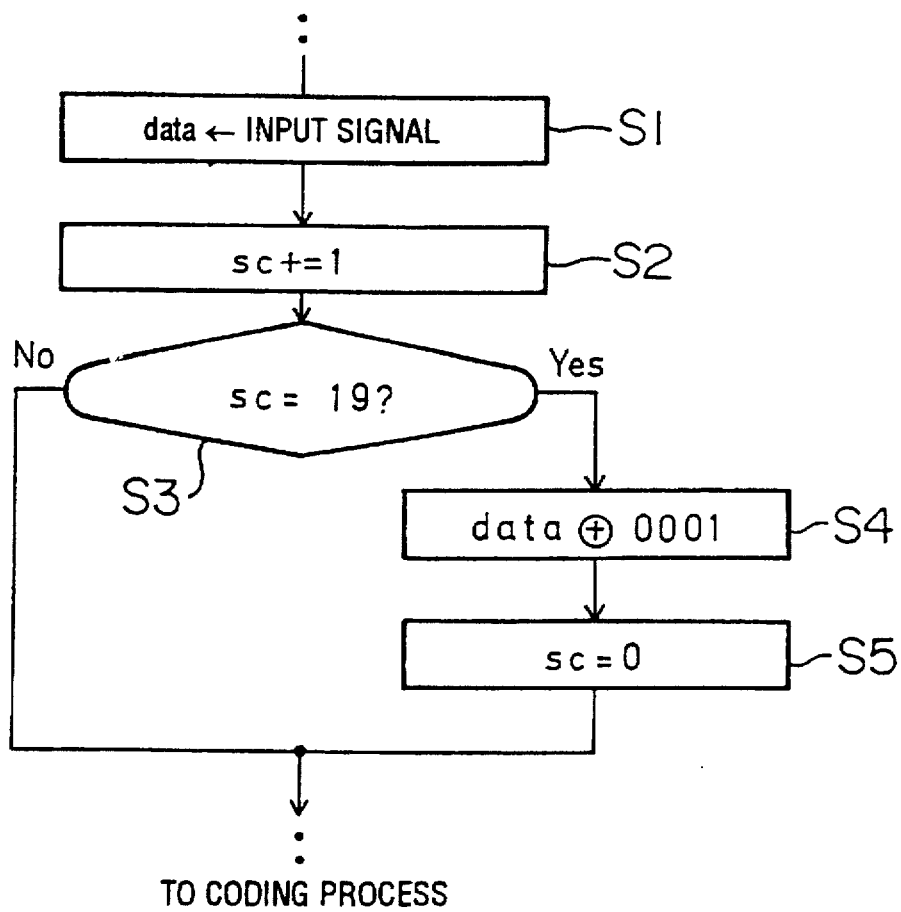
FIG. 6 is a flowchart of an operation sequence of the synchronizing apparatus according to the first embodiment.

FIG. 6 shows an operation sequence of the synchronizing apparatus according to the first embodiment. The operation sequence shown in FIG. 6 will be described below according to its successive steps. The operation sequence shown in FIG. 6 is started each time an input signal of one sample is supplied.

[S1] An input signal of one sample is set to "data".

[S2] The count SC of the sample counter 32 is incremented by "1".

[S3] If the count SC of the sample counter 32 is "19", then the processing goes to a step S4, and if not, the input signal is sent directly to the coder 22.

[S4] The "data" and the code signal "0001" are exclusive-ORed to invert the LSB of the input signal of one sample, and the signal with the inverted LSB is sent to the coder 22.

[S5] The count SC of the sample counter 32 is reset to "0".

Figure 7:
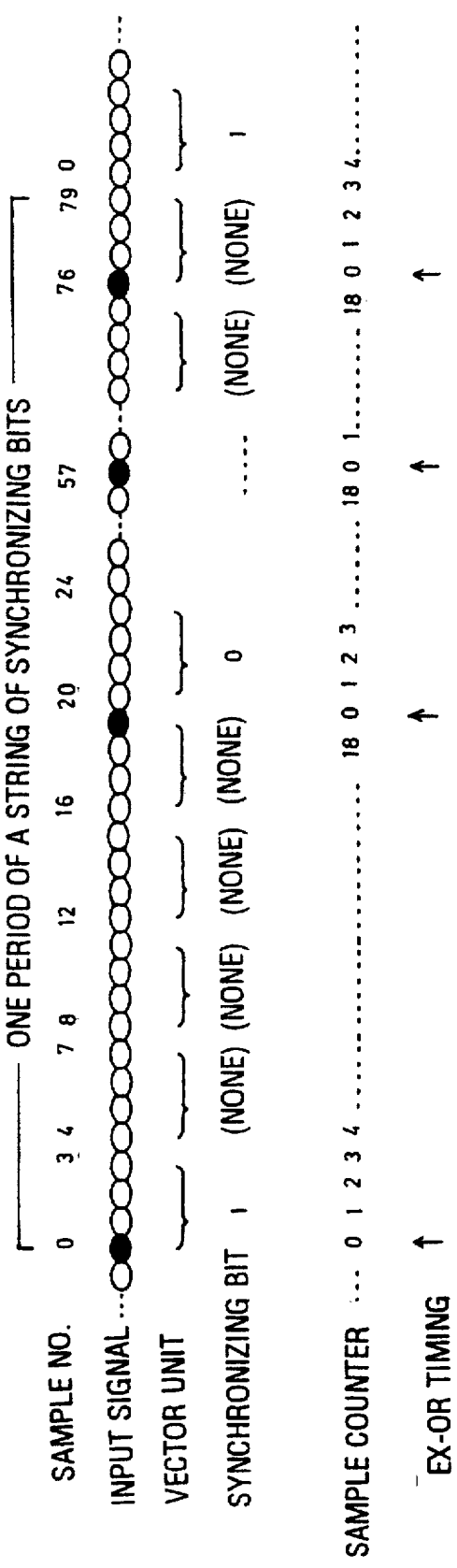
FIG. 7 is a timing chart of the operation of the synchronizing apparatus according to the first embodiment.

FIG. 7 illustrates the operation of the synchronizing apparatus according to the first embodiment with a timing chart. FIG. 7 also shows the manner in which the input signal is converted into a code book index by the coder 22. Specifically, one sample of the input signal is indicated by a blank circle in FIG. 7, one vector (code book index) is produced of four samples, and each bit of a string of synchronizing bits "1000" is inserted in every five vectors. Therefore, the period of a string of synchronizing bits spans 20 vectors (80 samples).

Each time the count SC of the sample counter 32 reaches "19" and is reset to "0" immediately thereafter, the LSB of the input signal is inverted. Inverted samples are indicated by solid circles in FIG. 7.

Since the LSB of the input signal is inverted in each period (19 samples) different from the period of a string of synchronizing bits (80 samples), even if the original input signal is periodic over 80 samples, the periodicity of the original input signal is broken. Therefore, when a code book index is generated on the basis of an input signal which no longer has the same period as a string of synchronizing bits, the code book index does not contain a string of bits having the same pattern as the string of synchronizing bits. As a result, no false synchronization is caused.

In the first embodiment, a noise component is added to an input signal in each period which differs from the period of a string of synchronizing bits. However, a noise which contains no periodic component, such as white noise or the like, may be added at a weak level to an input signal at all times.

Figure 8:
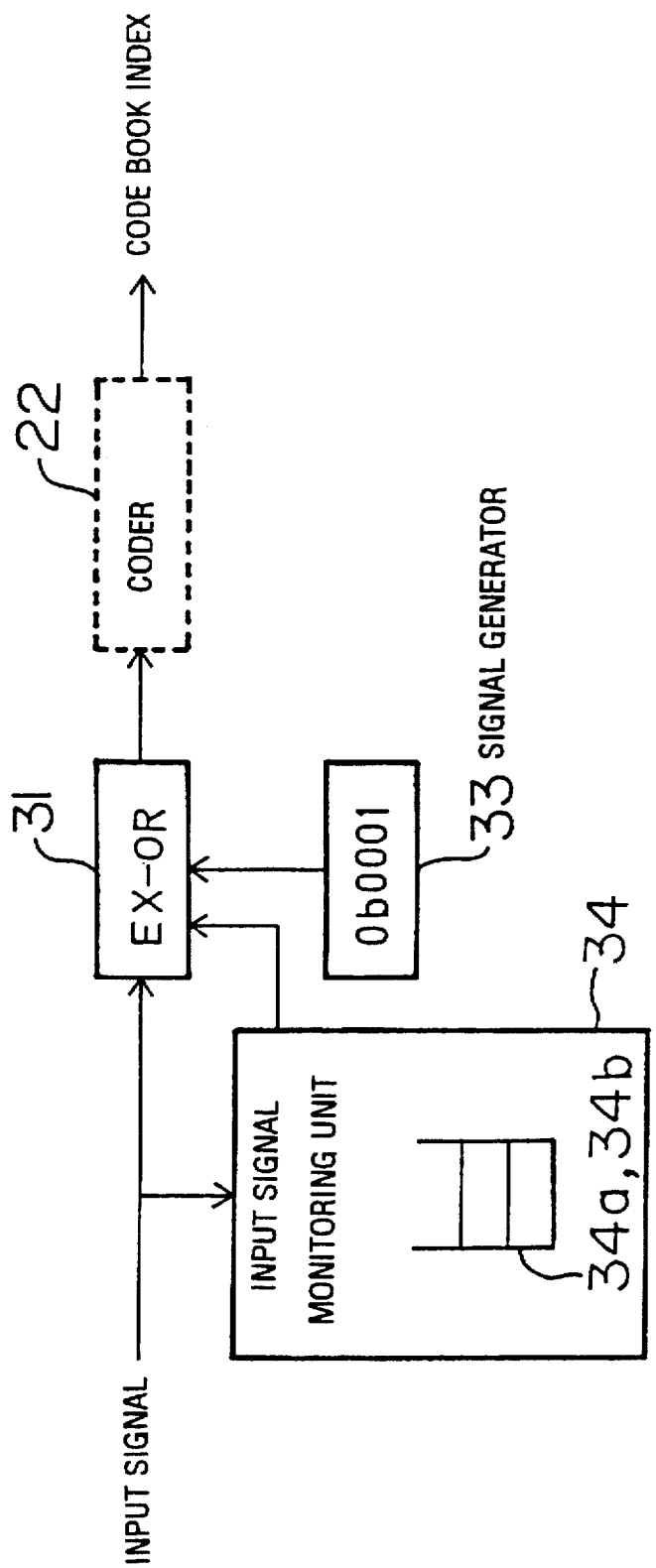
FIG. 8 is a block diagram of a synchronizing apparatus according to a second embodiment of the present invention.

FIG. 8 shows in block form a synchronizing apparatus according to a second embodiment of the present invention. The synchronizing apparatus according to the second embodiment is incorporated in the signal input interface 21 shown in FIG. 4. The synchronizing apparatus according to the second embodiment is basically similar to the synchronizing apparatus according to the first embodiment. Those parts of the synchronizing apparatus according to the second embodiment which are identical to those of the synchronizing apparatus according to the first embodiment are denoted by identical reference numerals, and will not be described in detail below.

The synchronizing apparatus according to the second embodiment has an input signal monitoring unit 34 connected in place of the sample counter 32 according to the first embodiment shown in FIG. 5. Other details of the synchronizing apparatus according to the second embodiment are identical to those of the synchronizing apparatus according to the first embodiment. The input signal monitoring unit 34 is supplied with an input signal, and outputs an operation command signal to the exclusive-OR gate 31. The input signal monitoring unit 34 has a pair of buffers 34a, 34b each capable of storing 80 samples. The input signal monitoring unit 34 stores, in the buffer 34a, 80 samples in a present period of a string of synchronizing bits of the continuous input signal, and stores, in the buffer 34b, 80 samples in a preceding period of the string of synchronizing bits. The input signal monitoring unit 34 compares corresponding samples in the buffers 34a, 34b with each other, and, if the compared samples agree with each other, determines that the input signal is periodic and its period is the same as the period (80 samples) of the string of synchronizing bits, and outputs an operation command signal to the exclusive-OR gate 31.

Figure 9:
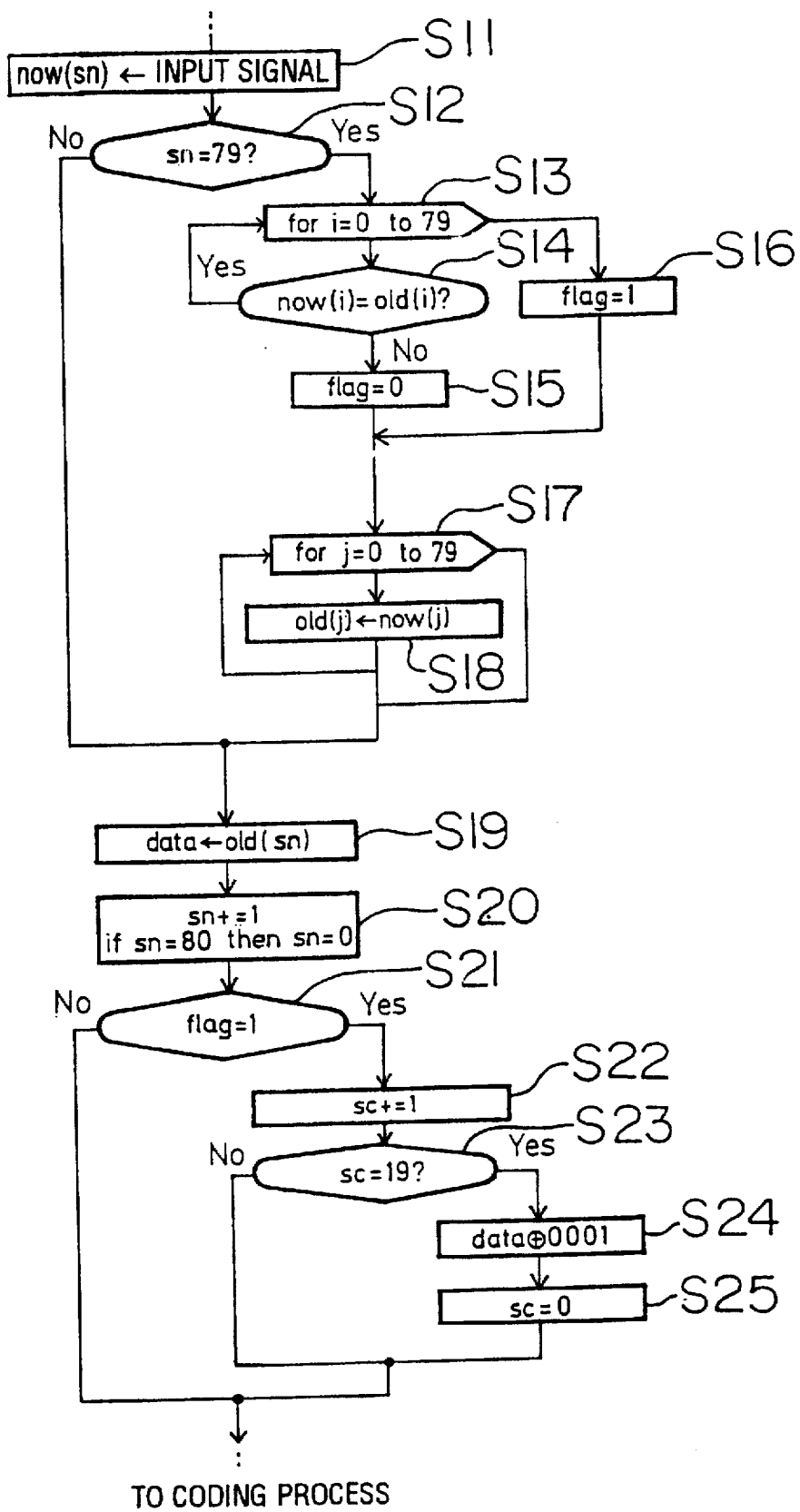
FIG. 9 is a flowchart of an operation sequence of the synchronizing apparatus according to the second embodiment.

FIG. 9 shows an operation sequence of the synchronizing apparatus according to the second embodiment. The operation sequence shown in FIG. 9 will be described below according to its successive steps. The operation sequence shown in FIG. 9 is started each time an input signal of one sample is supplied.

[S11] First, a sample number "sn" is assigned to each sample of the input signal. The sample number "sn" assigned to the sample corresponding to the start of a string of synchronizing bits is "0", and sample numbers "sn" are assigned to respective samples until the sample number "sn" reaches "79". Storage locations in the buffer 34a for storing 80 samples in the present period are given addresses "sn" ranging from "0" to "79", each of the storage locations in the buffer 34a being represented by "now(sn)". Similarly, storage locations in the buffer 34b for storing 80 samples in the preceding period are given addresses "sn" ranging from "0" to "79", each of the storage locations in the buffer 34b being represented by "old(sn)".

An input signal of a sample number "sn" is stored in the storage location "now(sn)" in the buffer 34a.

[S12] If the sample number "sn" of a sample that is presently inputted is "79", i.e., all the samples in the present period have been stored in the respective storage locations in the buffer 34a, then the processing goes to a step S13, and if it is not, then the processing goes to a step S19.

[S13] A control variable "i" is set to successive values ranging from "0" to "79" each time this step is executed. When this step is executed after the control variable "i" is set to "79", the processing proceeds to a step S14.

[S14] This step determines whether the sample stored in the storage location "now(i)" in the buffer 34a and the sample stored in the storage location "old(i)" in the buffer 34b agree with each other or not. If they agree with each other, then the processing returns to the step S13, and if they do not, then the processing goes to a step S15.

Figure 10:
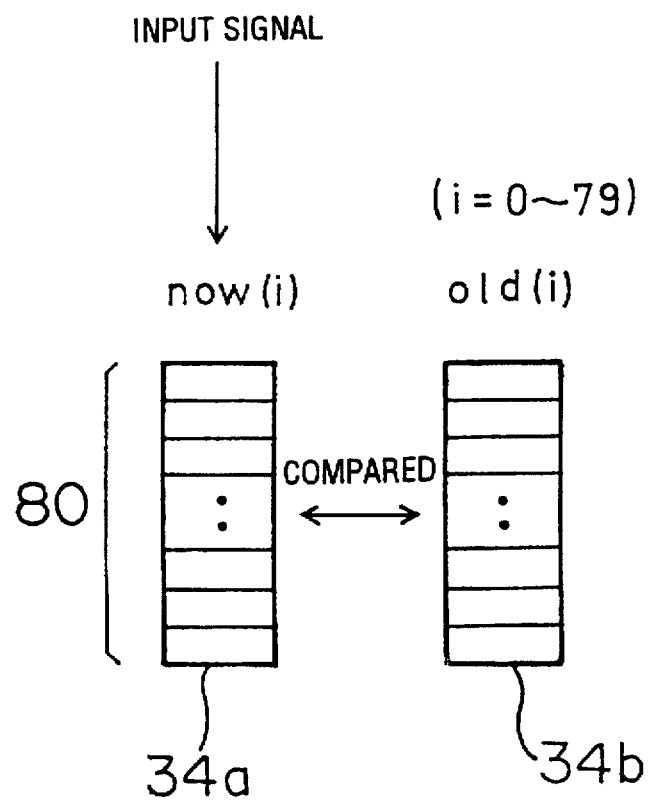
FIG. 10 is a block diagram showing buffers as they compare samples.

Comparison of the samples in the steps S13, S14 is illustrated in FIG. 10.

[S15] A flag is set to "0". The flag set to "0" represents that the 80 samples in the present period which are stored in the buffer 34a include samples that are not the same as the 80 samples in the preceding period which are stored in the buffer 34b. Therefore, when the flag is set to "0", it indicates that the input signal is not periodic as represented by the period of 80 samples.

[S16] The flag is set to "1". The flag set to "1" represents that each of the 80 samples in the present period which are stored in the buffer 34a is the same as one of the 80 samples in the preceding period which are stored in the buffer 34b. Therefore, when the flag is set to "1", it indicates that the input signal is completely periodic as represented by the period of 80 samples.

[S17] A control variable "j" is set to successive values ranging from "0" to "79" each time this step is executed. When this step is executed after the control variable "j" is set to "79", the processing proceeds to a step S19.

[S18] The sample stored in the storage location "now(j)" in the buffer 34a is shifted to the storage location "old(j)" in the buffer 34b.

Figure 11:
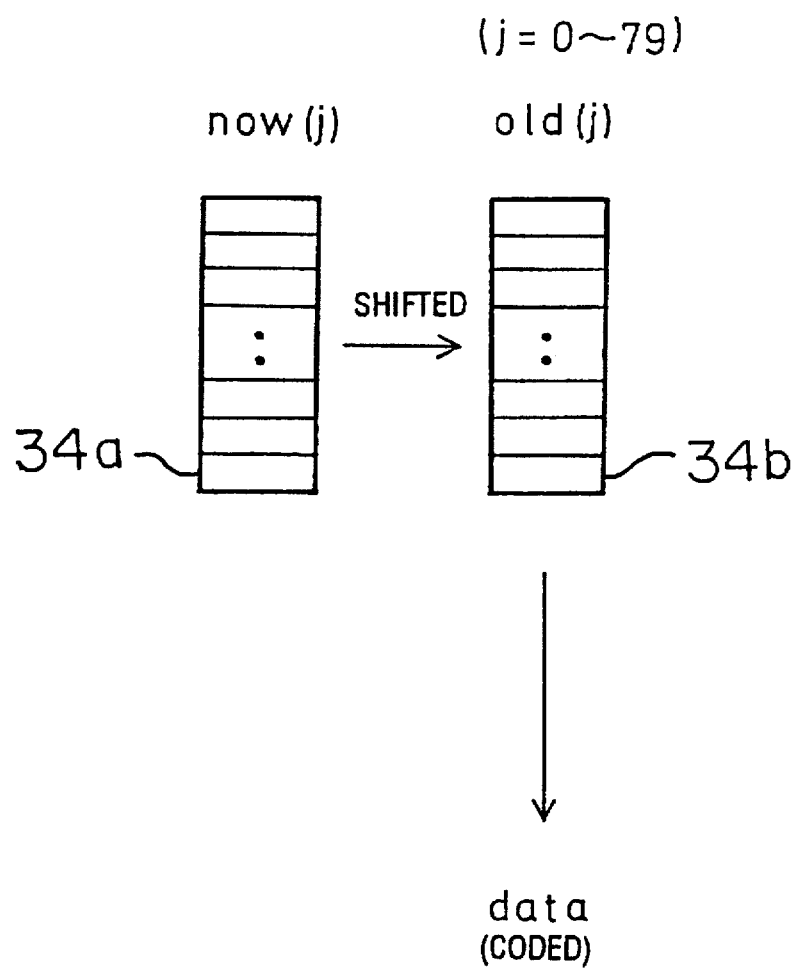
FIG. 11 is a block diagram showing the buffers as they shift samples.

Upon execution of the steps S17, S18, each of the 80 samples in the present period which are stored in the buffer 34a is transferred to the buffer 34b as shown in FIG. 11. The 80 samples thus transferred serve as 80 samples in a preceding period from the execution of a step S19 on.

[S19] The sample stored in the storage location "old(sn)" in the buffer 34b is set to "data".

[S20] The sample number "sn" is incremented by "1". When the sample number "sn" reaches "80", the sample number, "sn" is reset to "0".

[S21] If the flag is "0", then since the input signal is not periodic as represented by the period of 80 samples, the samples of the input signal are sent directly to the coder 22.

If the flag is "1", then since the input signal is completely periodic as represented by the period of 80 samples, the processing proceeds to steps S22~S25 in order to break the periodicity of the input signal.

The steps S22~S25 are identical to the steps S2~S5 according to the first embodiment shown in FIG. 6, and will not be described below.

According to the second embodiment, as described above, the input signal is monitored for its periodicity, and only when there is a possibility that code book indexes based on the input signal may produce patterns identical to a synchronizing pattern, a noise is added to the input signal to prevent a false synchronization. Since no noise is added when there is no possibility of a false synchronization, the quality of a reproduced voice signal is less liable to be degraded than with the synchronizing apparatus according to the first embodiment.

Figure 12:
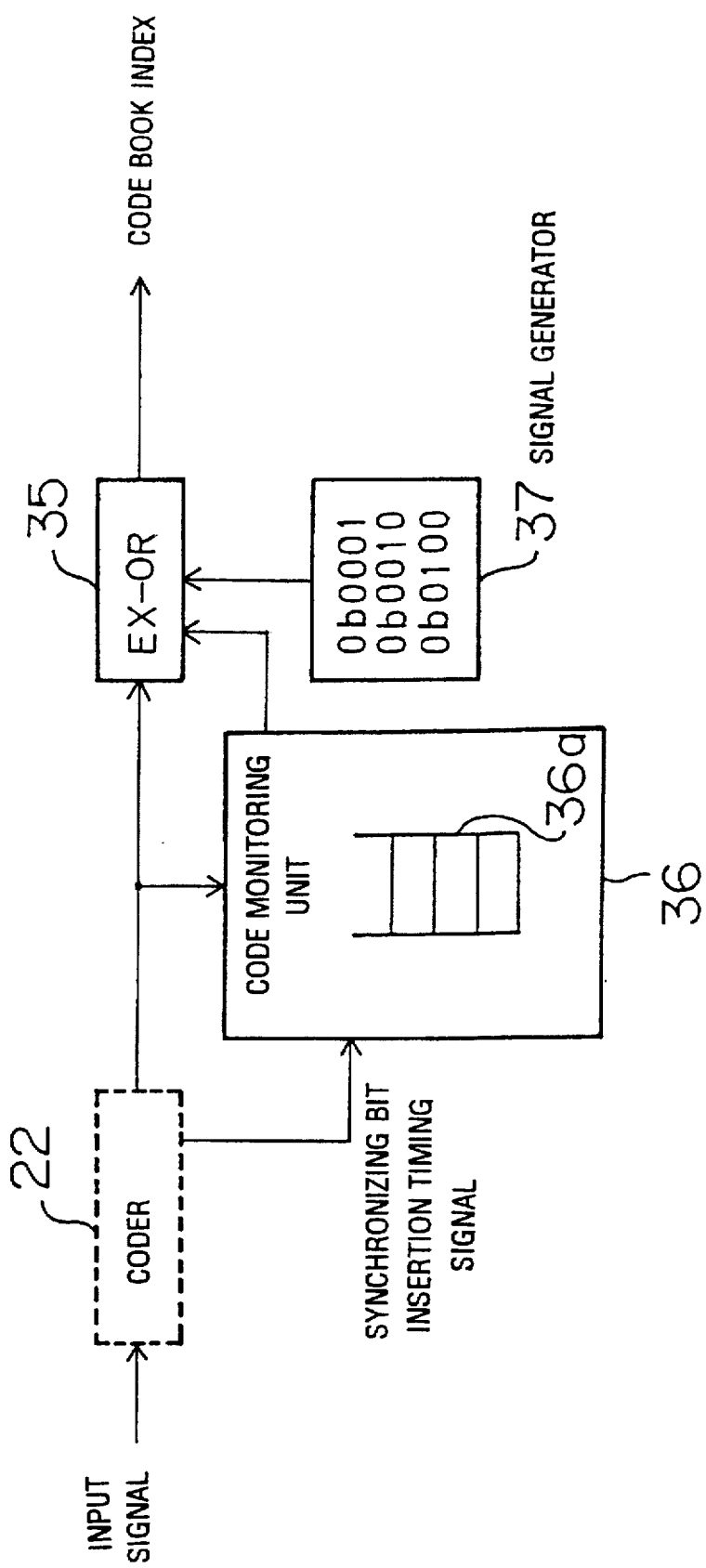
FIG. 12 is a block diagram of a synchronizing apparatus according to a third embodiment of the present invention.

FIG. 12 shows in block form a synchronizing apparatus according to a third embodiment of the present invention. The synchronizing apparatus according to the third embodiment is incorporated in the transmission path format converter 23 shown in FIG. 4, and serves to directly monitor a code book index (hereinafter referred to as an "index") outputted from the coder 22 for its periodicity and breaks the periodicity of code book index.

The coder 22 outputs an index to an exclusive-OR gate (EX-OR) 35 and a code monitoring unit 36. The coder 22 also sends a synchronizing bit insertion timing signal to the code monitoring unit 36. The synchronizing bit insertion timing signal is generated in every five vectors, for example, to insert a synchronizing bit into a corresponding index.

The code monitoring unit 36 has a buffer 36a for storing 12 indexes therein. Based on the synchronizing bit insertion timing signal, the code monitoring unit 36 selects only those indexes in which synchronizing bits have been inserted from received indexes, and stores 12 selected indexes (corresponding to three rear protective stages if the string of synchronizing bits represents "1000") in the buffer 36a. The code monitoring unit 36 determines whether a pattern identical to the synchronizing pattern "1000" of the string of synchronizing bits exists in phases other than the synchronizing bit phase (MSB) of the indexes stored in the buffer 36a, and if such a pattern exists, outputs an operation command signal containing the phase information of the pattern to the exclusive-OR gate 35.

The exclusive-OR gate 35 is supplied with three binary code signals "0001", "0010", "0100" representing phase information. In the absence of an operation command signal, the exclusive-OR gate 35 directly sends a received index to the voice decoder. When an operation command signal is applied to the exclusive-OR gate 35, the exclusive-OR gate 35 selects one of the binary code signals which corresponds to the phase information contained in the operation command signal, exclusive-ORs the received index and the selected binary code signal, and sends the result of the exclusive-ORing process to the voice decoder.

When the synchronizing apparatus shown in FIG. 12 thus operates, no pattern identical to the synchronizing pattern of the string of synchronizing bits exists any longer in phases other than the synchronizing bit phase of the indexes in which synchronizing bits are inserted. Usually, code books have been converted into a gray code for protection against random bit errors, and even when the transmitted index of a code vector suffers a one-bit error, another code vector having the same characteristics as the code vector is selected. Therefore, no problem is posed on the quality of a reproduced voice signal by the above exclusive-ORing process.

Figure 13:
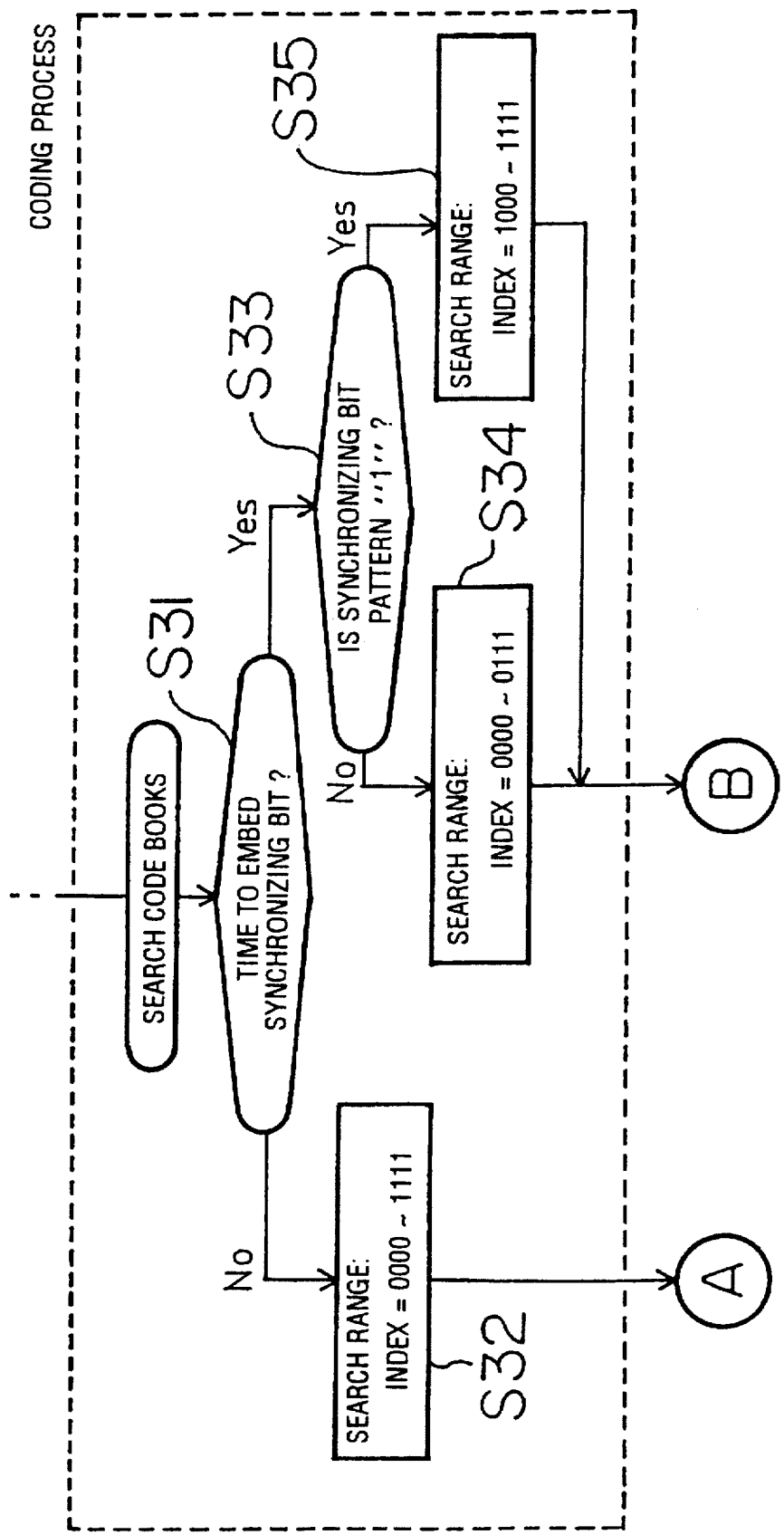
FIG. 13 is a flowchart of a former part of an operation sequence of the synchronizing apparatus according to the third embodiment.
Figure 14:
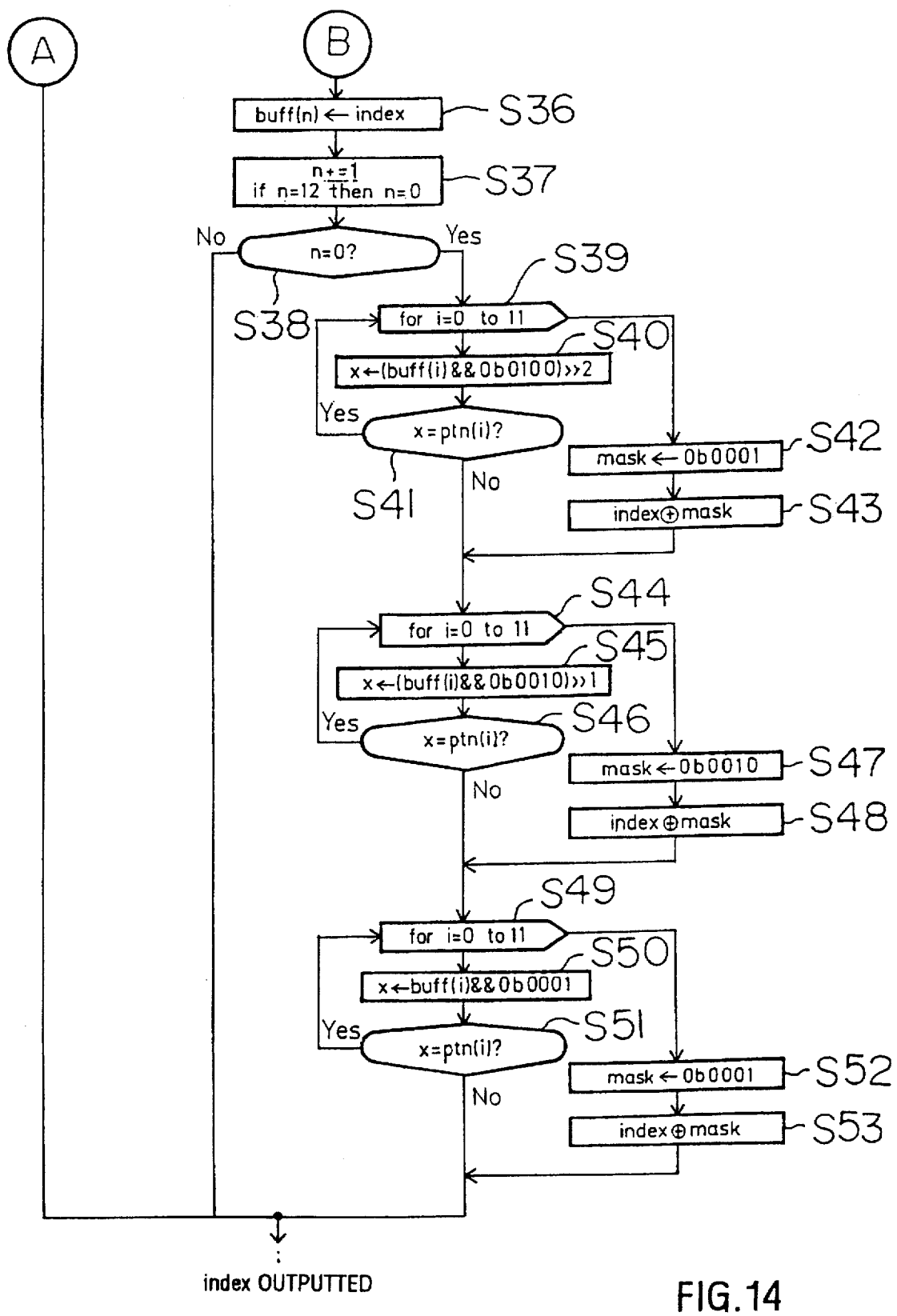
FIG. 14 is a flowchart of a latter part of the operation sequence of the synchronizing apparatus according to the third embodiment.

FIGS. 13 and 14 show an operation sequence of the synchronizing apparatus according to the third embodiment. FIG. 13 illustrates a former part of the operation sequence, and FIG. 14 a latter part of the operation sequence. The operation sequence shown in FIGS. 13 and 14 will be described below according to its successive steps. The operation sequence shown in FIGS. 13 and 14 is started when indexes are searched for. In this embodiment, each bit of a string of synchronizing bits "1000" is inserted in every five indexes, and each index is composed of a 4-bit code, and has three rear protective stages.

Figure 27:
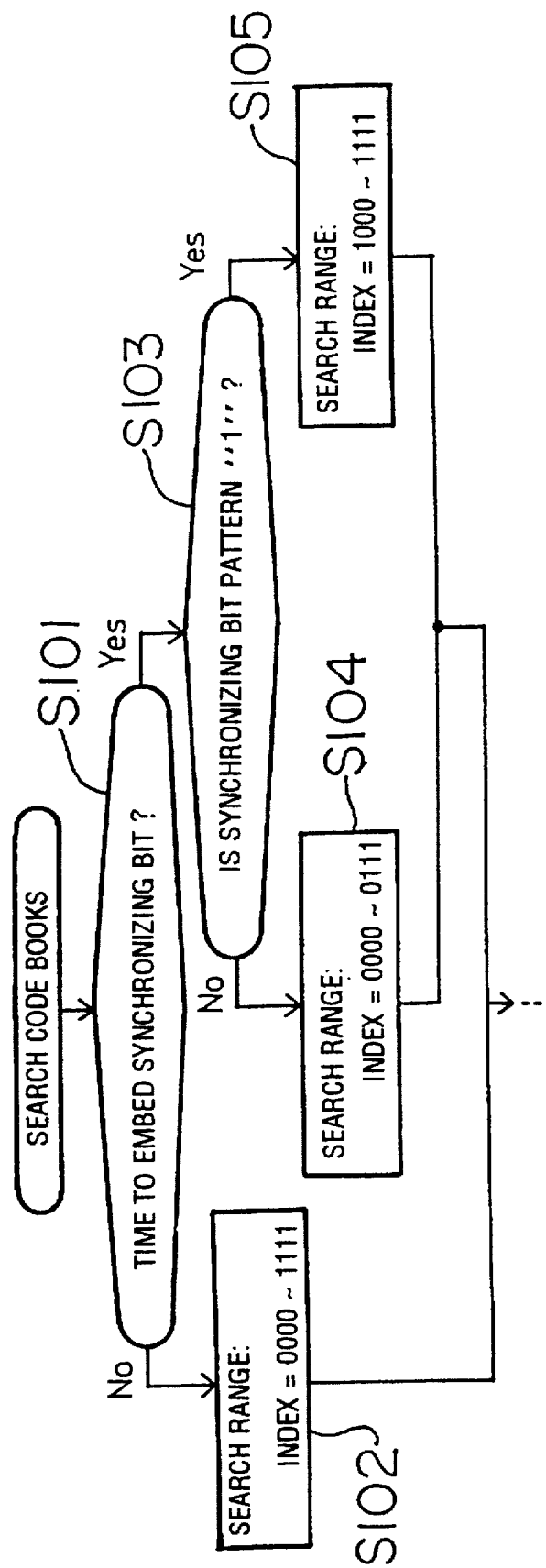
FIG. 27 is a flowchart of a searching the code book shown in FIG. 26.
Figure 28:
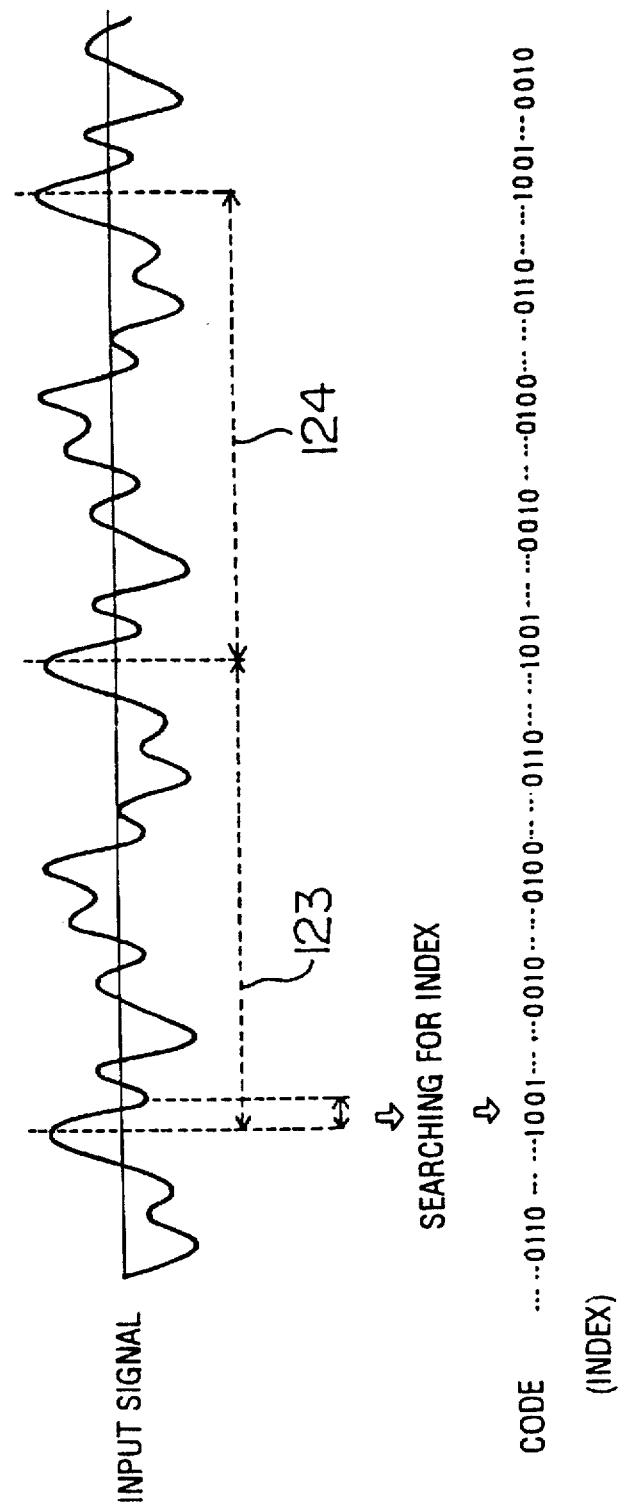
FIG. 28 is a diagram showing an input voice signal and indexes.
Figure 29:
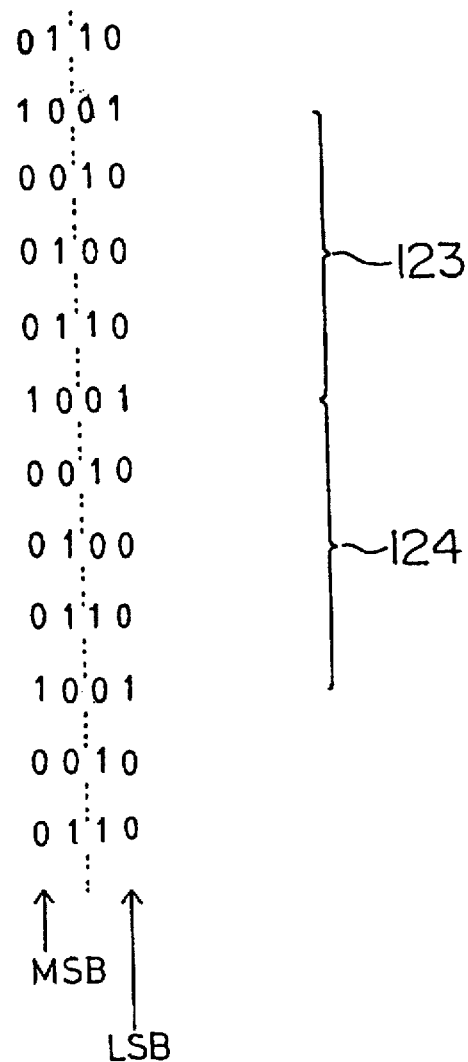
FIG. 29 is a diagram showing a vertical array of indexes.

[S31]~[S35] These steps are identical to the steps S101~S105 shown in FIG. 27, and will not be described below.

[S36] An nth inputted index in which a synchronizing bit has been embedded is stored in the storage location "buff(n)" having an address "n" in the buffer 36a.

[S37] The address "n" is incremented by "1". When the address "n" reaches "12", the address "n" is reset to "0".

Figure 15:
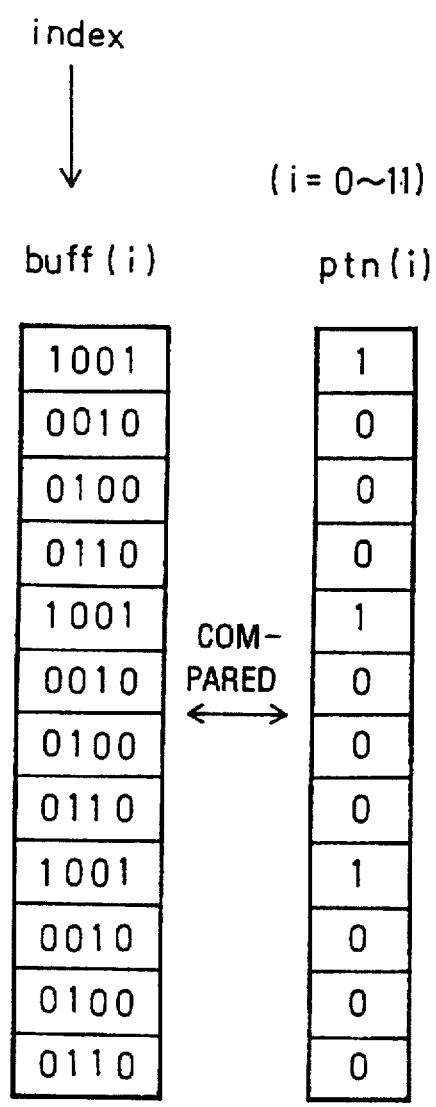
FIG. 15 is a diagram illustrative of comparison of patterns.

[S38] If the address "n" is "0", i.e., if indexes are stored in all the 12 storage locations in the buffer 36a, then the processing proceeds to a step S39. If the address "n" is not "0", the operation sequence is put to an end, and the inputted index is sent to the voice decoder. FIG. 15 shows, by way of example, indexes stored in all the 12 storage locations in the buffer 36a.

[S39] A control variable "i" is set to successive values ranging from "0" to "11" each time this step is executed. When this step is executed after the control variable "i" is set to "11", the processing proceeds to a step S42.

[S40] A high-order bit next to the MSB of the index stored in the storage location "buff(i)" is set to "x". For example, if "i" is "0" in FIG. 15, then "x" is "0", and if "i" is "2" in FIG. 15, then "x" is "1".

[S41] An ith code "ptn(i)" of patterns in three periods of strings of synchronizing bits is compared with "x". If the ith code "ptn (i)" is the same as "x", then the processing returns to the step S39. If the ith code "ptn(i)" is different from "x", then the processing goes to a step S44. In the example shown in FIG. 15, the processing goes to the step S44 when i =0.

[S42] The code signal "0100" is set to "mask".

[S43] An index at the time the operation sequence is started, which corresponds to the index stored in the storage location "buff(11)" in the buffer 36a, and the "mask" are exclusive-ORed, and the result of the exclusive-ORing process is sent to the voice decoder.

Specifically, when the index at the time the operation sequence is started and the code signal "0100" are exclusive-ORed, a high-order bit next to the MSB of the index at the time the operation sequence is started is inverted. Therefore, if a pattern which is the same as the synchronizing pattern exists over the three rear protective stages in the second phase of an index in which a synchronizing bit is embedded in the first phase (MSB), then either one of the codes in the second phase, i.e., the last 12th code, is inverted. In this manner, a false synchronization can be avoided which would otherwise be caused by a false pattern in the second phase which is identical to the synchronizing pattern.

[S44] The control variable "i" is set again to successive values ranging from "0" to "11" each time this step is executed. When this step is executed after the control variable "i" is set to "11", the processing proceeds to a step S47.

[S45] A low-order bit next to the LSB of the index stored in the storage location "buff(i)" is set to "x". For example, if "i" is "0" in FIG. 15, then "x" is "0", and if "i" is "1" in FIG. 15, then "x" is "1".

[S46] The ith code "ptn(i)" is compared with "x". If the ith code "ptn(i)" is the same as "x", then the processing returns to the step S44. If the ith code "ptn(i)" is different from "x", then the processing goes to a step S49. In the example shown in FIG. 15, the processing goes to the step S49 when i =0.

[S47] The code signal "0010" is set to "mask".

[S48] An index at the time the operation sequence is started, which corresponds to the index stored in the storage location "buff(11)" in the buffer 36a, and the "mask" are exclusive-ORed, and the result of the exclusive-ORing process is sent to the voice decoder.

Specifically, when the index at the time the operation sequence is started and the code signal "0010" are exclusive-ORed, a low-order bit next to the LSB of the index at the time the operation sequence is started is inverted. Therefore, if a pattern which is the same as the synchronizing pattern exists over the three rear protective stages in the third phase of an index in which a synchronizing bit is embedded in the first phase (MSB), then either one of the codes in the third phase, i.e., the last 12th code, is inverted. In this manner, a false synchronization can be avoided which would otherwise be caused by a false pattern in the third phase which is identical to the synchronizing pattern.

[S49] The control variable "i" is set again to successive values ranging from "0" to "11" each time this step is executed. When this step is executed after the control variable "i" is set to "11", the processing proceeds to a step S52.

[S50] The LSB of the index stored in the storage location "buff(i)" is set to "x". For example, if "i" is "0" in FIG. 15, then "x" is "1", and if "i" is "1" in FIG. 15, then "x" is "0".

[S51] The ith code "ptn(i)" is compared with "x". If the ith code "ptn(i)" is the same as "x", then the processing returns to the step S49. If the ith code "ptn(i)" is different from "x", then the operation sequence is finished, and the received index (the 11th index in which a synchronizing bit is embedded) is sent to the voice decoder. In the example shown in FIG. 15, the affirmative branch (Yes) results from the decision step S51 for i=0~11.

[S52] The code signal "0001" is set to "mask".

[S53] An index at the time the operation sequence is started, which corresponds to the index stored in the storage location "buff(11)" in the buffer 36a, and the "mask" are exclusive-ORed, and the result of the exclusive-ORing process is sent to the voice decoder.

Specifically, when the index at the time the operation sequence is started and the code signal "0001" are exclusive-ORed, the LSB of the index at the time the operation sequence is started is inverted. Therefore, if a pattern which is the same as the synchronizing pattern exists over the three rear protective stages in the fourth phase of an index in which a synchronizing bit is embedded in the first phase (MSB), which is the case with the example shown in FIG. 15, then either one of the codes in the fourth phase, i.e., the last 12th code, is inverted. In this manner, a false synchronization can be avoided which would otherwise be caused by a false pattern in the fourth phase which is identical to the synchronizing pattern. In the example shown in FIG. 15, the index "0110" stored in the storage location "buff(11)" and the code signal "0001" are exclusive-ORed, and the result "0111" of the exclusive-ORing process is sent to the voice decoder. With the index "0110" thus changed to "0111", no pattern identical to the synchronizing pattern of the string of synchronizing bits exists any longer over the three periods of the synchronizing pattern of the string of synchronizing bits. Therefore, when the voice decoder detects strings of synchronizing bits over the three rear protective stages, it detects only a true string of synchronizing bits, and no false synchronization is caused.

Figure 16:
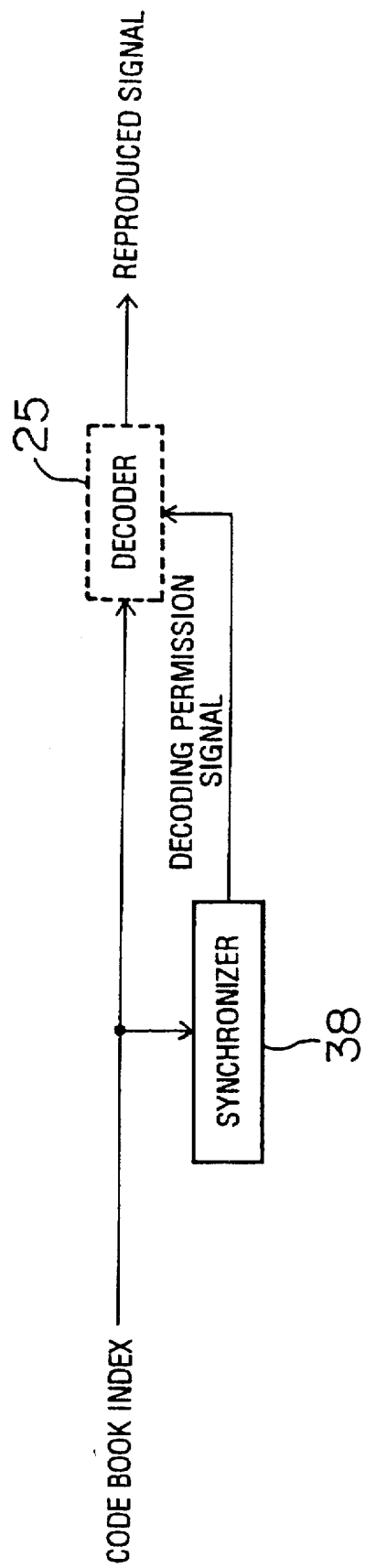
FIG. 16 is a block diagram of a synchronizing apparatus according to a fourth embodiment of the present invention.

FIG. 16 shows in block form a synchronizing apparatus according to a fourth embodiment of the present invention.

The synchronizing apparatus according to the fourth embodiment is incorporated in the transmission path format inverter 24 shown in FIG. 4. According to the fourth embodiment, if a string of synchronizing bits is detected in a plurality of phases over three rear protective stages in the voice decoder, then the period of time for detecting a string of synchronizing bits is extended to determine which string of bits in either one of the phases is a true string of synchronizing bits. Synchronizing apparatus according to fifth and sixth embodiments (described later on) are basically the same as the synchronizing apparatus according to the fourth embodiment, but differ therefrom with respect to the extended period of time for detecting a string of synchronizing bits.

In FIG. 16, an index transmitted from the voice coder is supplied to a decoder 25 and a synchronizer 38. The decoder 25 starts decoding the index only when it receives a decoding permission signal from the synchronizer 38.

Figure 17:
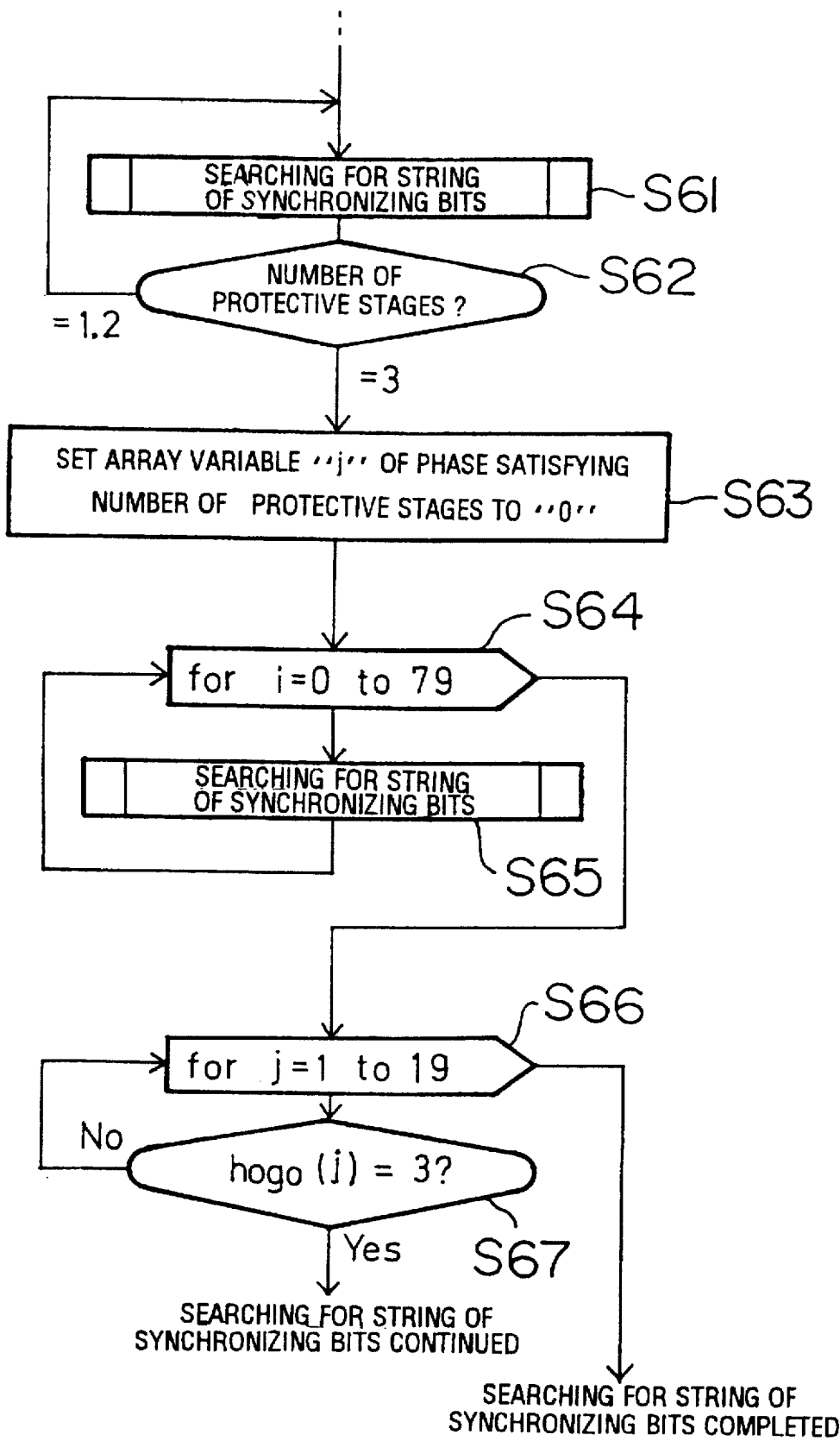
FIG. 17 is a flowchart of an operation sequence of the synchronizing apparatus according to the fourth embodiment.

FIG. 17 shows an operation sequence of the synchronizer 38. The operation sequence will be described below according to its successive steps. In this embodiment, each bit of a string of synchronizing bits "1000" is inserted in every five indexes, and each index is composed of a 4-bit code, and has three rear protective stages.

Figure 18:
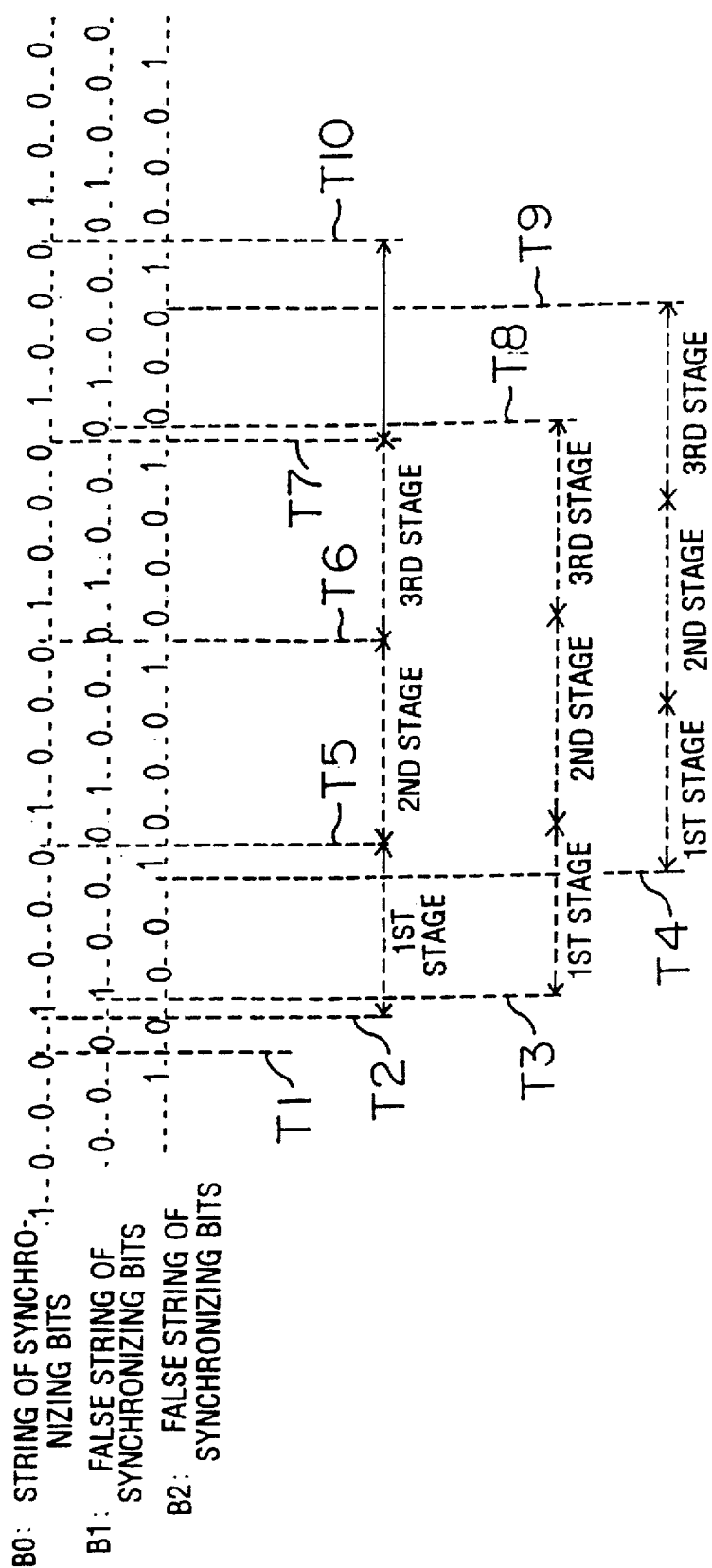
FIG. 18 is a timing chart of the operation of the synchronizing apparatus according to the fourth embodiment.

[S61] A string of synchronizing bits which is supposed to be contained in a string of successively received codes is searched for. Specifically, a string of bits that are picked up in every 20 bits, which is equal to the string of synchronizing bits "1000", is searched for. For example, as shown in FIG. 18, if it is assumed that a string of successively received codes contains not only a true string B0 of synchronizing bits, but also false strings B1, B2 of synchronizing bits which have the same pattern as the synchronizing pattern, then when the step S61 begins to be executed at a time T1, the string B0 of synchronizing bits is detected between a time T2 and a time T5.

[S62] If the string of synchronizing bits is detected three times in the step S61, i.e., if the number of protective stages is "3", then the processing goes to a step S63. If the string of synchronizing bits is detected once or twice, i.e., if the number of protective stages is "1" or "2", then the processing goes back to the step S61. In the example shown in FIG. 18, the processing goes to the step S63 at a time T7.

[S63] An array variable "j" corresponding to the phase of the string of synchronizing bits which has first satisfied the number of three protective stages is set to "0". Then, "1"~"19" are assigned respectively to array variables "j" corresponding to 19 phases following the above phase.

Satisfying the number of three protective stages signifies detecting a string of synchronizing bits over three successive periods thereof as a result of a process of detecting a string of synchronizing bits from a string of successively received codes, and is also referred to as establishing three rear protective stages.

A string of bits that are picked up in every 20 bits, which is equal to the string of synchronizing bits "1000", is also searched for in other phases up to the time T7. An established number "hogo(j)" of protective stages is accumulated in each phase. In the example shown in FIG. 18, at the time T7, the established number "hogo (0)" of protective stages of the string B0 of synchronizing bits is "3", the established number "hogo(a)" of protective stages of the false string B1 of synchronizing bits is "2", and the established number "hogo(b)" of protective stages of the false string B2 of synchronizing bits is "2" ("a", "b" are any number ranging from 1 to 19).

[S64] A control variable "i" is set to successive values ranging from "0" to "79" each time this step is executed. When this step is executed after the control variable "i" is set to "79", the processing proceeds to a step S66.

[S65] After the step S64 is executed, this step is executed to search for a string of synchronizing bits in phases other than the phase of the string of synchronizing bits which has first satisfied the number of three protective stages, for the protection of a further stage, i.e., in a period of time from the time T7 to a time T10. In the example shown in FIG. 18, at a time T8, the established number "hogo (a)" of protective stages of the false string B1 of synchronizing bits is "3", and at a time T9, the established number "hogo(b)" of protective stages of the false string B2 of synchronizing bits is also "3".

[S66] The array variable "j" is set to successive values ranging from "0" to "19" each time this step is executed.

When this step is executed after the control variable "j" is set to "19", a decoding permission signal is sent to the decoder 25 because it has been found out that no false string of synchronizing bits other than the true string of synchronizing bits exists.

[S67] After the step S66 is executed, this step is executed to determine whether the established number "hogo (j)" of protective stages in each phase is "3" or not, i.e., whether any of the established numbers "hogo(1)"~"hogo(19)" of protective stages in phases other than the phase which has first satisfied the number of three protective stages is "3" or not. If it is, then since a string of synchronizing bits is being detected in a plurality of phases, it is not clear which string of synchronizing bits is a true string of synchronizing bits. In this case, therefore, the number of rear protective stages is increased, and the operation sequence is repeated until only one string of synchronizing bits is detected, or the detection of a string of synchronizing bits is carried out again from the outset.

In this manner, the decoder 25 is prevented from decoding indexes unless a true string of synchronizing bits is detected.

A synchronizing apparatus according to a fifth embodiment of the present invention will be described below.

The synchronizing apparatus according to the fifth embodiment has an arrangement which is basically the same as that of the synchronizing apparatus according to the fourth embodiment except for the synchronizer 38, and hence will not be described in detail below.

Figure 19:
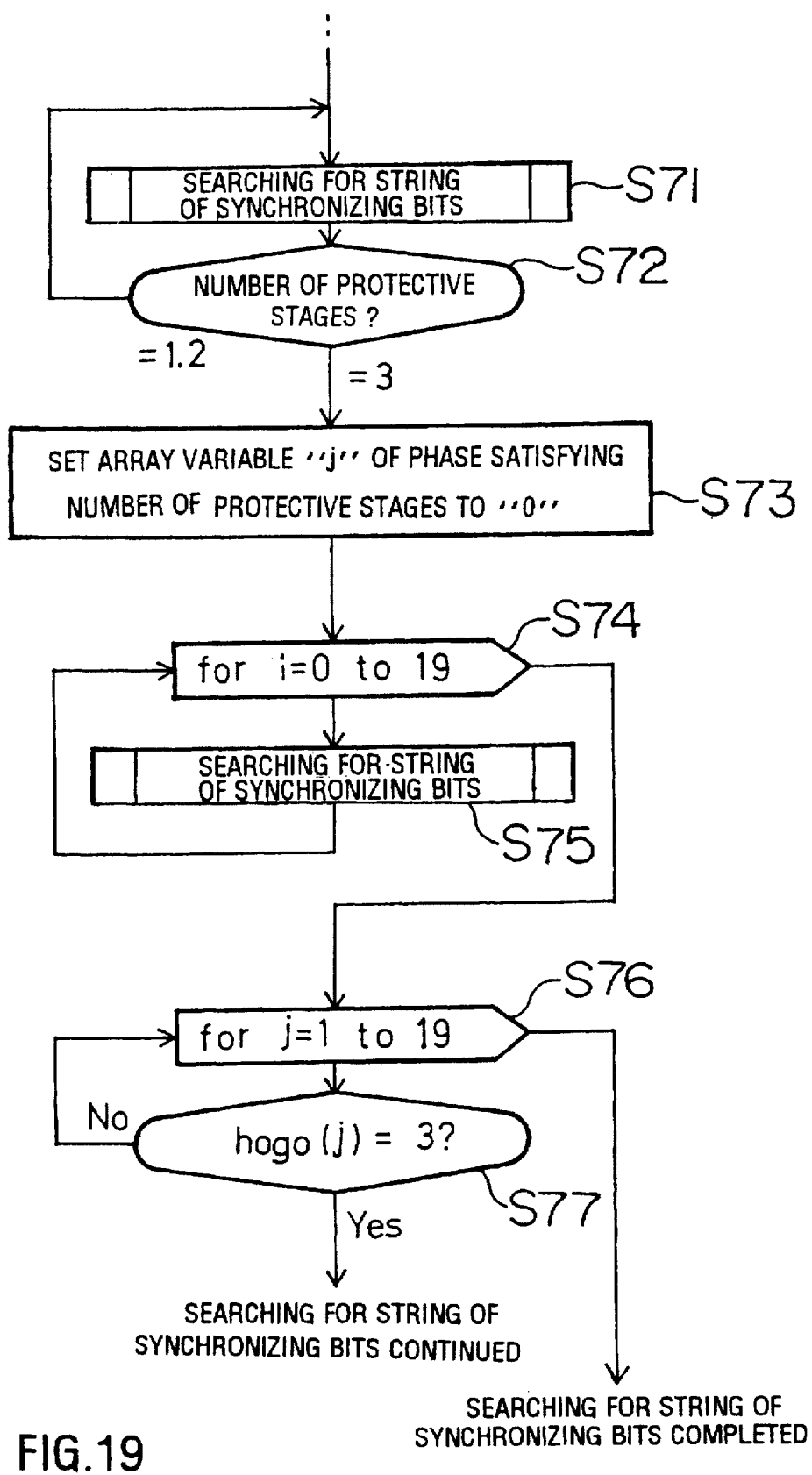
FIG. 19 is a flowchart of an operation sequence of a synchronizing apparatus according to a fifth embodiment of the present invention.

FIG. 19 shows an operation sequence of the synchronizer of the synchronizing apparatus according to the fifth embodiment. The operation sequence will be described below according to its successive steps. In this embodiment, each bit of a string of synchronizing bits "1000" is inserted in every five indexes, and each index is composed of a 4-bit code, and has three rear protective stages.

[S71] ~[S73] These steps are identical to the steps S61~S63 shown in FIG. 17, and will not be described below.

Figure 20:
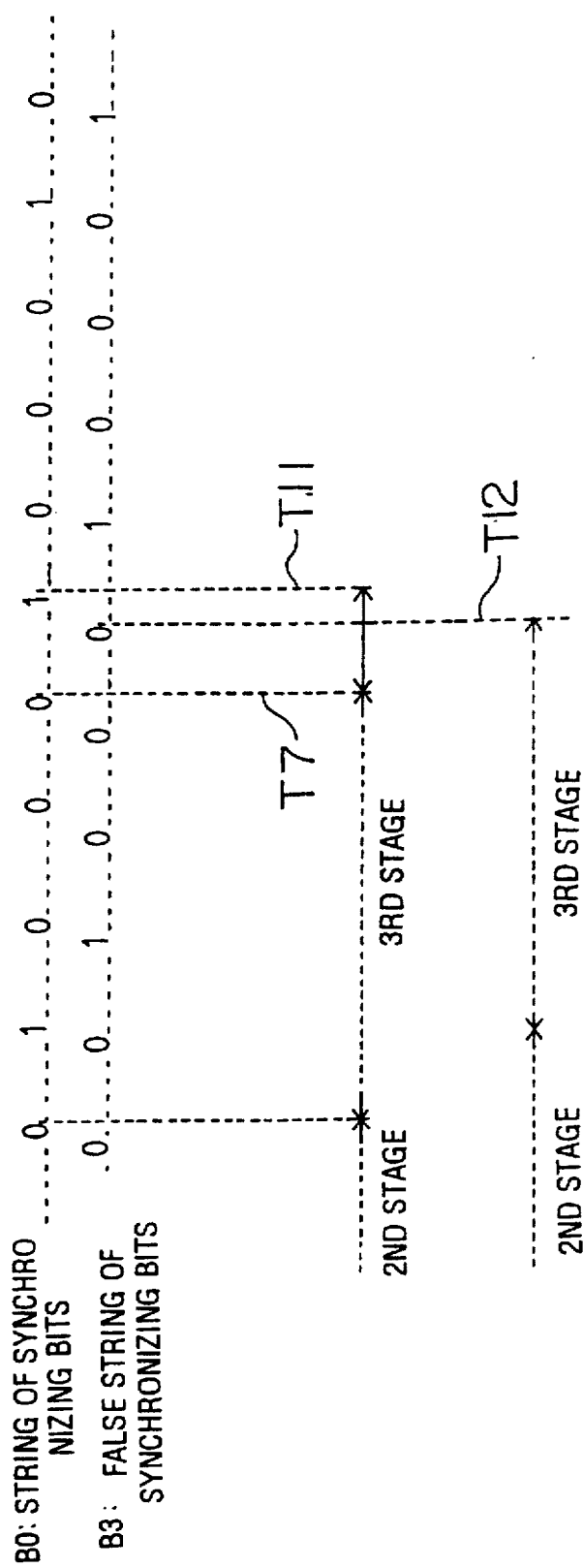
FIG. 20 is a timing chart of the operation of the synchronizing apparatus according to the fifth embodiment.

If it is assumed, as shown in FIG. 20, that a string of successively received codes contains not only a true string B0 of synchronizing bits, but also a false string B3 of synchronizing bits which has the same pattern as the synchronizing pattern, then, at a time T7, the established number "hogo(0)" of protective stages of the string B0 of synchronizing bits is "3", the established number "hogo(c)" of protective stages of the string B3 of synchronizing bits is "2" ("c" is any number ranging from 1 to 19).

[S74] A control variable "i" is set to successive values ranging from "0" to "19" each time this step is executed. When this step is executed after the control variable "i" is set to "19", the processing proceeds to a step S76. Whereas the control variable "i" is varied from "0" to "79" in the fourth embodiment, it is varied from "0" to "19" in the fifth embodiment.

[S75] After the step S74 is executed, this step is executed to search for a string of synchronizing bits with respect to a 20-bit phase, i.e., in phases other than the phase of the string of synchronizing bits which has first satisfied the number of three protective stages in a period of time from the time T7 to a time T11. In the example shown in FIG. 20, at a time T12, the established number "hogo(c)" of protective stages of the false string B3 of synchronizing bits is "3".

[S76]~[S77] These steps are identical to the steps S66~S67 shown in FIG. 17, and will not be described below. However, if the established number "hogo(j)" of protective stages in each phase is "3", then the operation sequence is repeated until only one string of synchronizing bits is detected in a period of time corresponding to 20 bits, or the detection of a string of synchronizing bits is carried out again from the outset.

In this manner, the decoder 25 is prevented from decoding indexes unless a true string of synchronizing bits is detected.

The synchronizing apparatus according to the fourth embodiment can reliably confirm the absence of any false synchronizing pattern, but requires a large-scale monitoring device such as a received code buffer. According to the fifth embodiment, however, a monitoring device may be of a smaller scale as it monitors only phases where the possibility of a false string of synchronizing bits is high.

A synchronizing apparatus according to a sixth embodiment of the present invention will be described below. According to the sixth embodiment, a range to be monitored for determining whether a false string of synchronizing bits is produced or not is smaller than the range to be monitored according to the fifth embodiment. In this embodiment, each bit of a string of synchronizing bits "1000" is inserted in every five indexes, and each index is composed of a 4-bit code, and has three rear protective stages.

Figure 22:
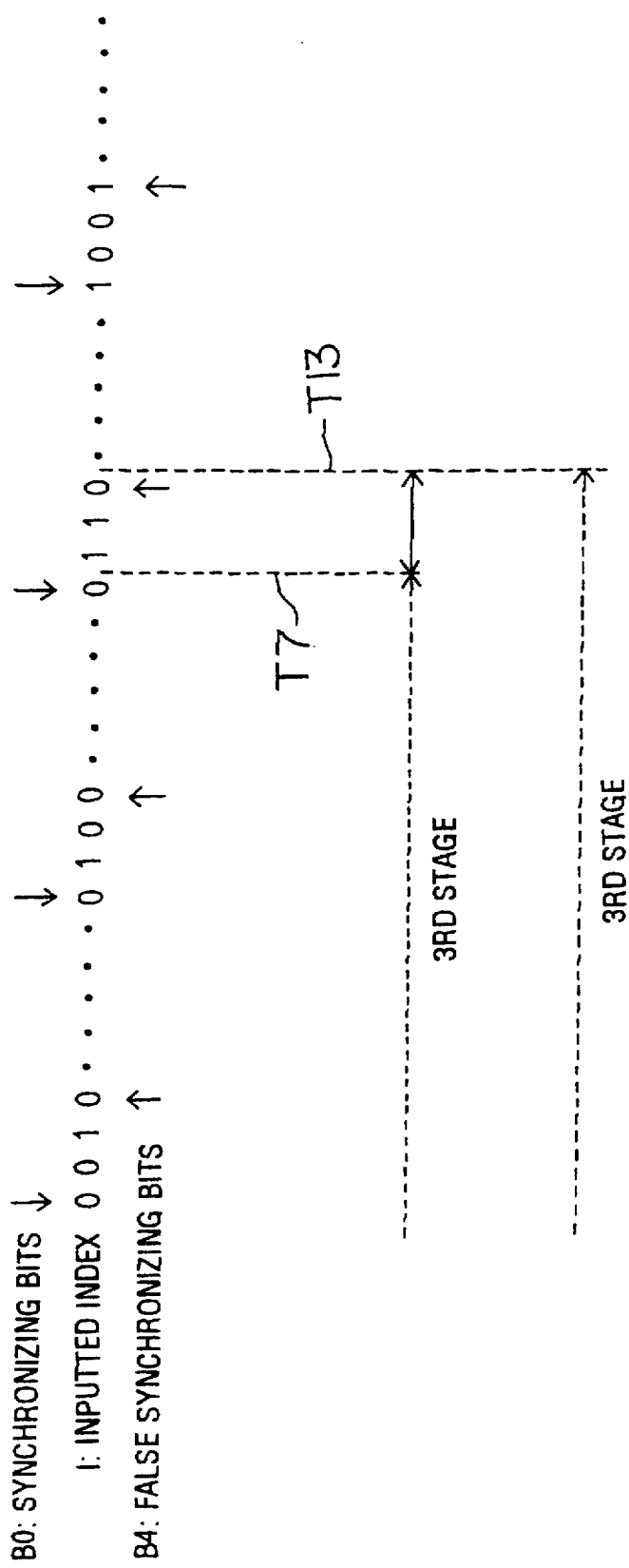
FIG. 22 is a timing chart of a first mode of operation of the synchronizing apparatus according to the sixth embodiment.

More specifically, as shown in FIG. 22, only three bits (time T13) from the position of the synchronizing bit (time T7) in the third rear protective stage are monitored. For example, even if a false synchronizing bit (B4) is present in the LSB of an index I in which a synchronizing bit (B0) is embedded, as shown in FIG. 22, the establishment of three rear protective stages of a false string of synchronizing bits can be confirmed at a time T13. Therefore, even when a true string of synchronizing bits and a false string of synchronizing bits are switched around, the synchronizing apparatus is prevented from causing a false synchronization according to the above confirming process.

Figure 23:
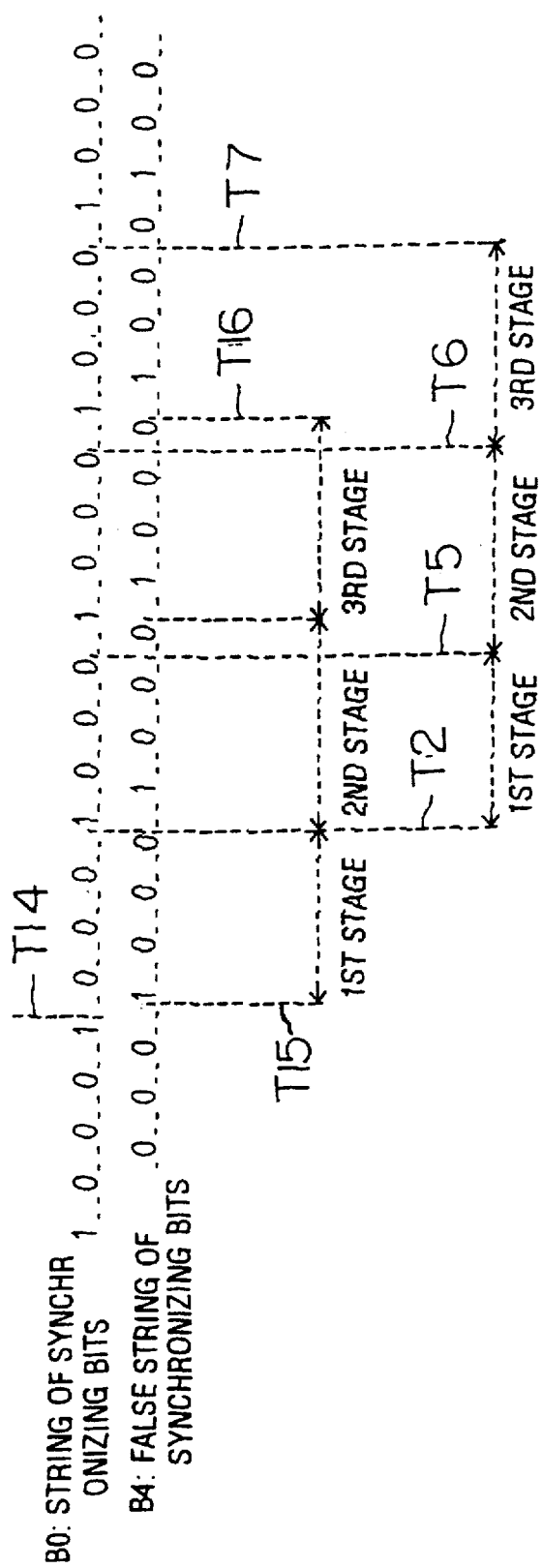
FIG. 23 is a timing chart of a second mode of operation of the synchronizing apparatus according to the sixth embodiment.

However, as shown in FIG. 23, if codes start being received at a time T14, then even when a false string of synchronizing bits (B4) establishes the third rear protective stage at a time T16 and three bits are monitored as described above, the establishment of a true string of synchronizing bits (B0) cannot be confirmed because the true string of synchronizing bits (B0) establishes the third rear protective stage at the time T7.

Figure 24:
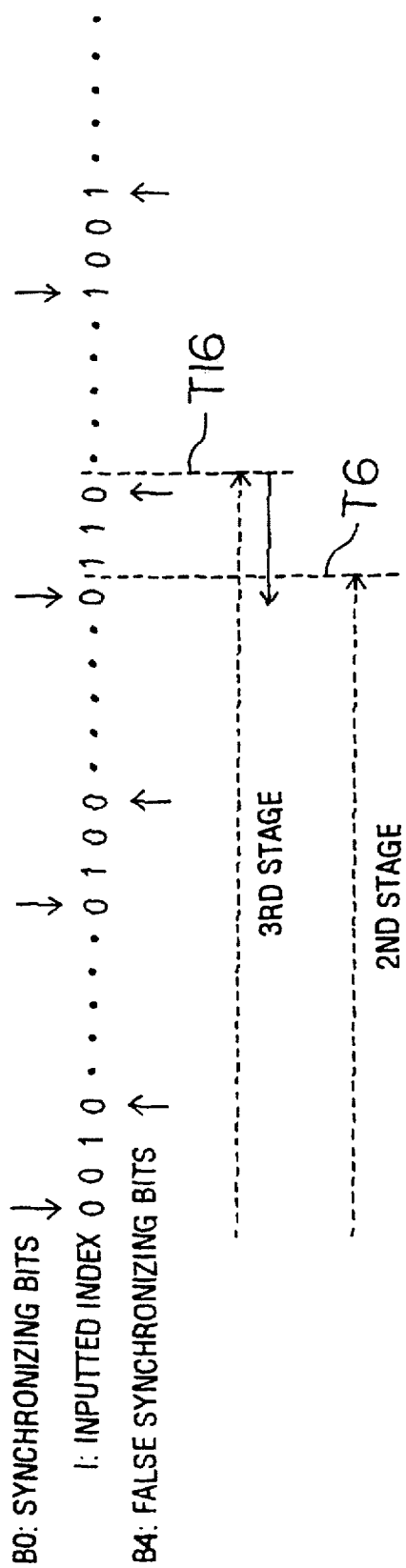
FIG. 24 is a timing chart of a third mode of operation of the synchronizing apparatus according to the sixth embodiment.

To solve the above problem, according to the sixth embodiment, three rear bits (time T13) from the position of the synchronizing bit (time T7) in the third rear protective stage are monitored, and also, as shown in FIG. 24, three front bits are monitored, and if the establishment of two rear protective stages is confirmed during the three front bits, no decoding permission signal is sent to the decoder 25 because of the danger of a false synchronization.

The synchronizing apparatus according to the sixth embodiment has an arrangement which is basically the same as that of the synchronizing apparatus according to the fourth embodiment except for the synchronizer 38, and hence will not be described in detail below.

Figure 21:
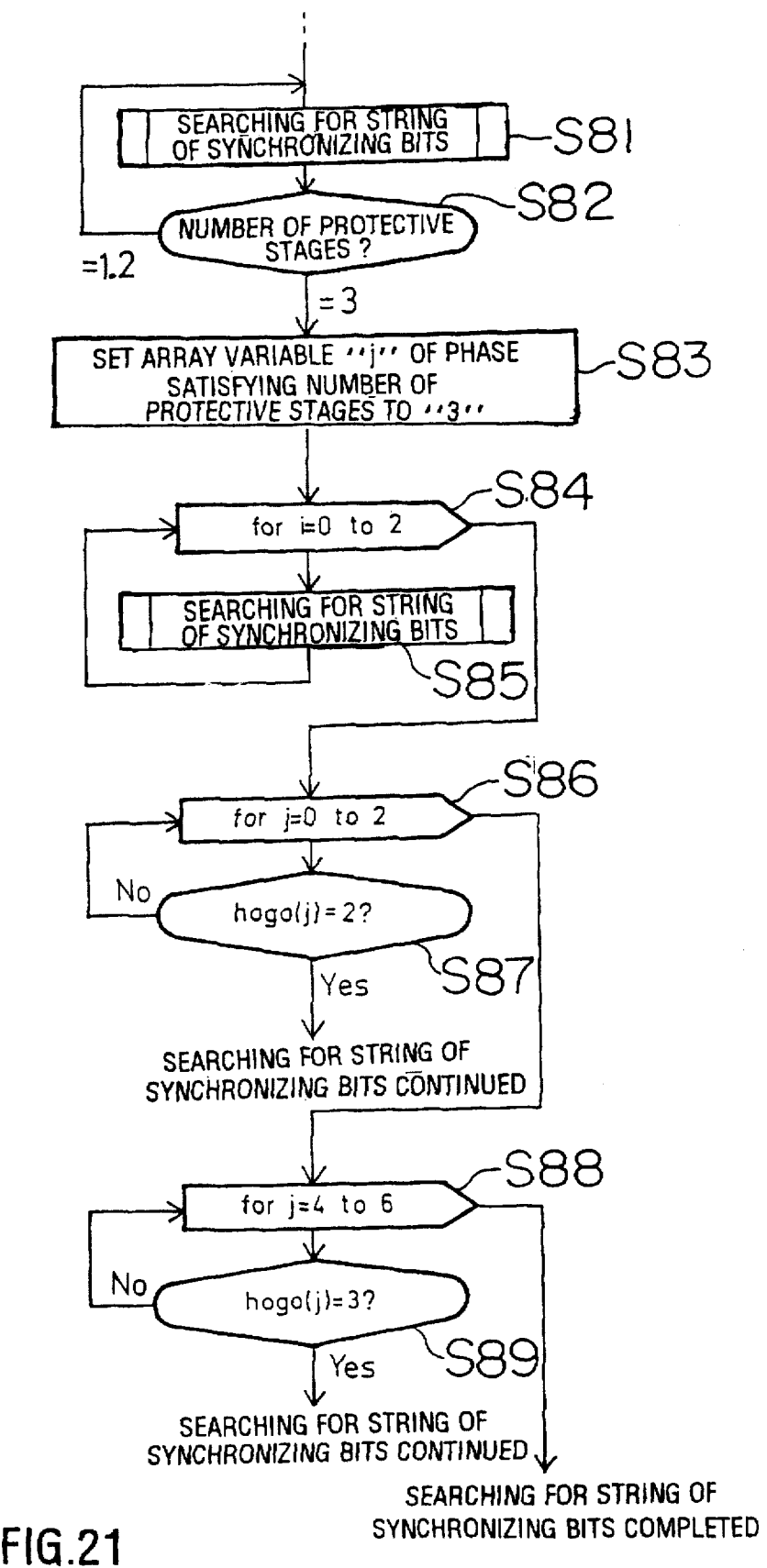
FIG. 21 is a flowchart of an operation sequence of a synchronizing apparatus according to a sixth embodiment of the present invention.

FIG. 21 shows an operation sequence of the synchronizer of the synchronizing apparatus according to the sixth embodiment. The operation sequence will be described below according to its successive steps.

[S81]~[S82] These steps are identical to the steps S61~S62 shown in FIG. 17, and will not be described below.

[S83] An array variable "j" corresponding to the phase of the string of synchronizing bits which has first satisfied the number of three protective stages is set to "3". Then, "4"~"6" are assigned respectively to array variables "j" corresponding to three phases following the above phase, and "0"~"2" are assigned respectively to array variables "j" corresponding to three phases preceding the above phase.

[S84] A control variable "i" in is set to successive values ranging from "0" to "2" each time this step is executed. When this step is executed after the control variable "i" in is set to "2", the processing proceeds to a step S86. Whereas the control variable "i" is varied from "0" to "19" in the step S74 according to the fifth embodiment, it is varied from "0" to "2" in the sixth embodiment.

[S85] After the step S84 is executed, this step is executed to search for a string of synchronizing bits with respect to the phase of three rear bits. Specifically, a string of synchronizing bits in phases other than the phase of the string of synchronizing bits which has first satisfied the number of three protective stages is searched for in a period of time from the time T7 to the time T13 in FIG. 22.

[S86] The array variable "j" is set to successive values ranging from "0" to "2" each time this step is executed. When this step is executed after the array variable "j" is set to "2", the processing proceeds to a step S88.

[S87] After the step S86 is executed, this step is executed to determine whether the established number "hogo(j)" of protective stages in each phase is "2" or not, i.e., whether there is a string of synchronizing bits (B0) which has established two protective stages or not prior to an establishing time T16 for the string of synchronizing bits (B4) which has first established three protective stages. If there is, then since a string of synchronizing bits is being detected in a plurality of phases, it is not clear which string of synchronizing bits is a true string of synchronizing bits. In this case, therefore, the range to be monitored is increased by three rear bits, and the operation sequence is repeated until only one string of synchronizing bits is detected, or the detection of a string of synchronizing bits is carried out again from the outset.

[S88] The array variable "j" is set to successive values ranging from "4" to "6" each time this step is executed. When this step is executed after the control variable "j" is set to "6", a decoding permission signal is sent to the decoder 25 because it has been found out that no false string of synchronizing bits other than the true string of synchronizing bits exists.

[S89] After the step S88 is executed, this step is executed to determine whether the established number "hogo(j)" of protective stages in each phase is "3" or not, i.e., whether any of the numbers "hogo(4)"~"hogo(6)" of protective stages of the string of synchronizing bits which have first satisfied the number of three protective stages is "3" or not. If it is, then since a string of synchronizing bits is being detected in a plurality of phases, it is not clear which string of synchronizing bits is a true string of synchronizing bits. In this case, therefore, the range to be monitored is increased by three rear bits, and the operation sequence is repeated until only one string of synchronizing bits is detected, or the detection of a string of synchronizing bits is carried out again from the outset.

Consequently, the decoder 25 is prevented from decoding indexes unless a true string of synchronizing bits is detected.

According to the present invention, in the voice coder, the noise component adding means adds a noise component to an input voice signal. Therefore, even if the input voice signal has the same period as that of a string of synchronizing bits and is completely periodic, the periodicity of the input voice signal is lost by the added noise component. Based on the input voice signal which is no longer periodic, the vector-coding means, the quantizing signal vector generating means, and the code book index transmitting means generate code book indexes and transmit the generated code book indexes to the voice decoder. Therefore, the voice decoder is prevented from developing a false synchronization.

In the voice coder, the code book index transmitting means monitors a code book index selected by the code book index selecting means, and, if there is a string of bits having the same pattern as the synchronizing pattern, inverts a bit of the string of bits and transmits the string of bits including the inverted bit to the voice decoder. The voice decoder which has received the code book index thus processed is prevented from developing a false synchronization.

In the voice decoder, the synchronizing bit string detecting means detects a string of synchronizing bits having a certain pattern contained in the received code book index over a predetermined number of rear protective stages. The confirming means confirms whether the string of synchronizing bits detected by the synchronizing bit string detecting means is a true string of synchronizing bits or not. The synchronizing means synchronizes the received code book index based on the confirmed string of synchronizing bits. Since the received code book index is synchronized based on the string of synchronizing bits which has been confirmed as a true string of synchronizing bits by the confirming means, the voice decoder is free from the danger of a false synchronization.

As described above, the generation of a false string of synchronizing bits is prevented by the voice coder, and the synchronization of a code book index based on a false synchronizing pattern is prevented by the voice decoder. Therefore, a voice signal is prevented from being reproduced according to a false synchronization.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for synchronizing a voice coder of the vector-coding type, comprising:

vector-coding means for vector-coding an input voice signal and outputting a target vector;

quantizing signal vector generating means for generating a quantizing signal vector based on a code vector from a code book;

code book index transmitting means for determining an error between the target vector outputted from said vector-coding means and the quantizing signal vector generated by said quantizing signal vector generating means, and selecting a code book index corresponding to a code vector to minimize the error from the code book based on the bit-stealing principle and sending the selected index to a voice decoder; and noise component adding means, preceding said vector-coding means, for adding a noise component to the input voice signal which is to be supplied to said vector-coding means.

2. An apparatus according to claim 1, wherein said code book index transmitting means comprises synchronizing bit string inserting means for inserting a string of synchronizing bits having a predetermined period into the code book index based on the bit-stealing principle, and said noise component adding means comprises means for adding the noise component to the input voice signal at a period different from said predetermined period of said string of synchronizing bits.

3. An apparatus according to claim 1, wherein said code book index transmitting means comprises synchronizing bit string inserting means for inserting a string of synchronizing bits having a predetermined period into the code book index based on the bit-stealing principle, further comprising addition limiting means, preceding said vector-coding means, for comparing present and preceding data of the input voice signal corresponding to said predetermined period of said string of synchronizing bits with each other, and operating said noise component adding means only when the compared present and preceding data agree with each other.

4. An apparatus for synchronizing a voice coder of the vector-coding type, comprising:

vector-coding means for vector-coding an input voice signal and outputting a target vector;

quantizing signal vector generating means for generating a quantizing signal vector based on a code vector from a code book;

code book index selecting means for determining an error between the target vector outputted from said vector-coding means and the quantizing signal vector generated by said quantizing signal vector generating means, and selecting a code book index corresponding to a code vector to minimize the error from the code book based on the bit-stealing principle; and code book index transmitting means for monitoring the code book index selected by said code book index selecting means, and, if there is a string of bits having the same pattern as a synchronizing pattern, inverting a bit of the string of bits, and transmitting the string of bits with the inverted bit to a voice decoder.

5. An apparatus according to claim 4, wherein said code book index transmitting means comprises means for inverting the bit once in a period in which to receive as many synchronizing patterns as the number of rear protective stages in the voice decoder.

6. An apparatus for synchronizing a voice decoder for receiving a code book index from a voice coder of the vector-coding type, comprising:

synchronizing bit string detecting means for detecting a string of synchronizing bits having a predetermined pattern, contained in a received code book index, over a predetermined number of rear protective stages;

confirming means for confirming whether the string of synchronizing bits detected by said synchronizing bit string detecting means is a true string of synchronizing bits or not;

synchronizing means for synchronizing the received code book index based on the string of synchronizing bits which has been confirmed as a true string of synchronizing bits by said confirming means; and reproduced signal outputting means for reading a code vector from a code book based on the synchronized code book index, and generating and outputting a reproduced signal.

7. An apparatus according to claim 6, further comprising inhibiting means for inhibiting the received code book index from being synchronized based on the string of synchronizing bits detected by said synchronizing bit string detecting means if said string of synchronizing bits is not confirmed as a true string of synchronizing bits by said confirming means.

8. An apparatus according to claim 6, wherein said confirming means comprises means for detecting, over a further rear protective stage, whether a string of synchronizing bits having said predetermined pattern, other than the string of synchronizing bits detected by said synchronizing bit string detecting means, is contained in the received code book index over said predetermined number of rear protective stages, and determining that the string of synchronizing bits detected by said synchronizing bit string detecting means is a true string of synchronizing bits if a string of synchronizing bits other than the string of synchronizing bits detected by said synchronizing bit string detecting means is not detected.

9. An apparatus according to claim 6, wherein said confirming means comprises means for detecting, up to a time to receive a next synchronizing bit, whether a string of synchronizing bits having said predetermined pattern, other than the string of synchronizing bits detected by said synchronizing bit string detecting means, is contained in the received code book index over said predetermined number of rear protective stages, and determining that the string of synchronizing bits detected by said synchronizing bit string detecting means is a true string of synchronizing bits if a string of synchronizing bits other than the string of synchronizing bits detected by said synchronizing bit string detecting means is not detected.

10. An apparatus according to claim 6, wherein said confirming means comprises means for detecting, in a first detecting step up to a time to receive as many next bits as (a number constituting a vector—1), whether a string of synchronizing bits having said predetermined pattern, other than the string of synchronizing bits detected by said synchronizing bit string detecting means, is contained in the received code book index over said predetermined number of rear protective stages, detecting, in a second detecting step back to a receiving time over as many bits as (a number constituting a vector—1), whether a string of synchronizing bits having said predetermined pattern, other than the string of synchronizing bits detected by said synchronizing bit string detecting means, is contained in the received code book index over as many rear protective stages as (said predetermined number of rear protective stages—1), and determining that the string of synchronizing bits detected by said synchronizing bit string detecting means is a true string of synchronizing bits if a string of synchronizing bits other than the string of synchronizing bits detected by said synchronizing bit string detecting means is not detected in each of said first and second detecting steps.

* * * * *